(12) United States Patent
Khoshnevisan et al.

(10) Patent No.: US 11,818,728 B2
(45) Date of Patent: *Nov. 14, 2023

(54) TECHNIQUES FOR LIMITING BLIND DECODING FOR MULTI-DCI BASED MULTI-TRANSMIT-RECEIVE POINTS

(71) Applicant: QUALCOMM Incorporated, San Diego, CA (US)

(72) Inventors: Mostafa Khoshnevisan, San Diego, CA (US); Xiaoxia Zhang, San Diego, CA (US); Peter Gaal, San Diego, CA (US); Kazuki Takeda, Tokyo (JP)

(73) Assignee: QUALCOMM Incorporated, San Diego, CA (US)

(*) Notice: Subject to any disclaimer, the term of this patent is extended or adjusted under 35 U.S.C. 154(b) by 135 days.

This patent is subject to a terminal disclaimer.

(21) Appl. No.: 17/454,556

(22) Filed: Nov. 11, 2021

(65) Prior Publication Data

US 2022/0070839 A1 Mar. 3, 2022

Related U.S. Application Data

(63) Continuation of application No. 17/120,878, filed on Dec. 14, 2020, which is a continuation of application
(Continued)

(51) Int. Cl.
*H04W 72/00* (2023.01)
*H04W 72/23* (2023.01)
(Continued)

(52) U.S. Cl.
CPC ......... *H04W 72/23* (2023.01); *H04L 27/2676* (2013.01); *H04W 72/542* (2023.01); *H04W 72/0446* (2013.01)

(58) Field of Classification Search
CPC ............... H04W 72/23; H04W 72/542; H04W 72/0446; H04L 27/2676
See application file for complete search history.

(56) References Cited

U.S. PATENT DOCUMENTS 10,939,428 B2 3/2021 Khoshnevisan
2019/0223164 A1 7/2019 He et al.
(Continued)

FOREIGN PATENT DOCUMENTS

WO 2018231812 A1 12/2018
WO 2021203276 A1 10/2021

OTHER PUBLICATIONS

3GPP TS 38.213: "3rd Generation Partnership Project; Technical Specification Group Radio Access Network; NR; Physical Layer Procedures for Control (Release 15)", 3GPP Standard, Technical Specification, 3GPP TS 38.213 V15.6.0 (Jun. 2019), 3rd Generation Partnership Project (3GPP), Mobile Competence Centre, Sophia-Antipolis Cedex, France, vol. RAN WG1, No. V15.6.0, Jun. 24, 2019 (Jun. 24, 2019), pp. 1-107, XP051754327, [retrieved on Jun. 24, 2019] section 1 "Scope" section 8 "Random access procedure", Chapter 8. in particular table 8.1-1.
(Continued)

*Primary Examiner* — Rhonda L Murphy
(74) *Attorney, Agent, or Firm* — ArentFox Schiff LLP

(57) ABSTRACT

Since multiple transmit-receive point (TRP) communications may increase the number of physical downlink control channel (PDCCH) candidates without increasing the number of cells, new limits for multi-TRP communications may be defined. A UE may determine a PDCCH monitoring capability across all downlink serving cells that may account for multiple-TRP cells and for carrier aggregation and dual connectivity using a multiplication factor for serving cells with two control resource set (CORESET) groups, for signaling a number representing PDCCH monitoring capa-
(Continued)

bility across all downlink serving cells. Further, the UE may determine limits of a number of serving cells based on the capability and a configuration of serving cells. The UE may determine a total limit and a per cell limit of PDCCH candidates and non-overlapped control channel elements (CCEs) to monitor in a slot for a cell group. The UE may perform blind decoding operations within the limits.

20 Claims, 11 Drawing Sheets

Related U.S. Application Data

No. 16/930,003, filed on Jul. 15, 2020, now Pat. No. 10,939,428.

(60) Provisional application No. 62/876,572, filed on Jul. 19, 2019.

(51) Int. Cl.
*H04L 27/26* (2006.01)
*H04W 72/542* (2023.01)
*H04W 72/0446* (2023.01)

(56) References Cited

U.S. PATENT DOCUMENTS

| | | | |
|---|---|---|---|
| 2020/0267788 A1* | 8/2020 | Nammi | H04L 5/0053 |
| 2021/0099983 A1 | 4/2021 | Khoshnevisan et al. | |
| 2022/0182860 A1 | 6/2022 | Chatterjee et al. | |

OTHER PUBLICATIONS

ETSI: "5G; NR; Physical Layer Procedures for Control (3GPP TS 38.213 Version 15.4.0 Release 15), TS 138213 V 15.4.0", Apr. 1, 2019 (Apr. 1, 2019), XP055735769, 106 Pages, Retrieved from the Internet: URL: http://www.etsi.org/deliver/etsi_ts/138200_138299/138213/15.04.00_60/ts_138213v150400p.pdf [retrieved on Oct. 1, 2020] p. 76-p. 77.
Huawei, et al., "Enhancements on Multi-TRP/Panel Transmission", 3GPP Draft, 3GPP TSG RAN WG1 #97, R1-1906029, 3rd Generation Partnership Project (3GPP), Mobile Competence Centre, Sophia-Antipolis Cedex, France, vol. RAN WG1, No. Reno, USA, May 13, 2019-May 17, 2019, May 13, 2019 (May 13, 2019), XP051727486, 17 pages, Retrieved from the Internet: URL:http://www.3gpp.org/ftp/Meetings%5F3GPP%5FSYNC/RAN1/Docs/R1%2D1906029%2Ezip [retrieved on May 13, 2019], the whole document, A Paragraph[0003]-Paragraph[0004].
Huawei., et al., "Summary of AI: 7.2.8.2 Enhancements on Multi-TRP/PanelTransmission of Offline Discussion", 3GPP Draft, R1-1907706, 3GPP TSG-RAN WG1 Meeting #97, FL Summary of Enhancements ONNCJT_V1, 3rd Generation Partnership Project (3GPP), Sophia-Antipolis Cedex, France, vol. RAN WG1, No. Reno, USA, May 13, 2019-May 17, 2019, May 16, 2019, XP051739989, 66 Pages, Retrieved from the Internet:URL: http://www.3gpp.org/ftp/tsg%5Fran/WG1%5FRL1/TSGR1%5F97/Docs/R1%2D1907706%2Ezip [retrieved on May 16, 2019] The Whole Document.
International Search Report and Written Opinion—PCT/US2020/042393—ISA/EPO—dated Dec. 9, 2020.
NTT DOCOMO, Inc: "Enhancements on Multi-TRP/Panel Transmission", 3GPP Draft, R1-1906224, 3GPP TSG RAN WG1 #97, 3GPP, Mobile Competence Centre, Sophia-Antipolis Cedex, France, vol. RAN WG1, No. Reno, USA, May 13, 2019, 32 Pages, XP051727678, Retrieved from the Internet: URL: http://www.3gpp.org/ftp/Meetings%5F3GPP%5FSYNC/RAN1/Docs/R1%2D1906224%2Ezip [retrieved on May 13, 2019], p. 19, Paragraph 3.1.1, p. 21, Paragraph 3 .1. 2, p. 2 Last Two Agreements, Proposals 2-3, 2-4, 2-11, p. 12, paragraphs [0002]-[0003].
Panasonic: "On Multi-TRP Enhancements for NR MIMO in Rel. 16", 3GPP Draft, 3GPP TSG RAN WG1 #97, R1-1907031_Panasonic_NR_MIMO_Multi_TRP_Enhancements_VFinal, 3rd Generation Partnership Project (3GPP), Sophia-Antipolis Cedex, vol. RAN WG1, No. Reno, USA, May 13, 2019-May 17, 2019, May 13, 2019, XP051728479, 16 Pages, Retrieved from the Internet: URL: http://www.3gpp.org/ftp/Meetings%5F3GPP%5FSYNC/RAN1/Docs/R1%2D1907031%2Ezip [retrieved on May 13, 2019]p. 9.
Partial International Search Report—PCT/US2020/042393—ISA/EPO—dated Oct. 16, 2020.
Qualcomm Incorporated: "On NR Mobility Enhancements", 3GPP Draft; R1-1913221, 3GPP TSG-RAN WG1 Meeting #99, 3rd Generation Partnership Project (3GPP), MobileCompetence Centre, 650, Route Des Lucioles, F-06921 Sophia-Antipolis Cedex, France, vol. RAN WG1, No. Reno, USA, Nov. 18, 2019-Nov. 22, 2019, Nov. 14, 2019 (Nov. 14, 2019), XP051825287, 7 Pages, Retrieved from the Internet: URL: https://ftp.3gpp.org/tsg_ran/WG1_RL1/TSGR1_99/Docs/R1-1913221.zip [retrieved on Nov. 14, 2019] The Whole Document.
Samsung, et al., "CR on PDCCH Monitoring for NR-DC", R1-1907957, 3GPP TSG RAN WG1 Meeting #97, Reno, USA, May 13-17, 2019, 4 Pages.
Vivo: "Further Discussion on Multi-TRP/Panel Transmission", 3GPP Draft, 3GPP TSG RAN WG1 #97, R1-1906159_Further Discussion on Multi-TRP/Panel Transmission_Final, 3GPP, Mobile Competence Centre, Sophia-Antipolis Cedex, France, vol. RAN WG1, No. Reno. USA, May 13, 2019-May 17, 2019, May 4, 2019, XP051708200, 18 pages, Retrieved from the Internet: URL: http://www.3gpp.org/ftp/tsg%5Fran/WG1%5FRL1/TSGR1%5F97/Docs/R1%2D1906159%2Ezip. [retrieved on May 4, 2019], chapters 2. 3.1. 4.1.3. 5-7, Section 2.1. 3.1.
Huawei., et al., "Correction on PDCCH Monitoring", R1-1905250, 3GPP TSG RAN WG1 Meeting #96bis Xi'an, China, Apr. 8-12, 2019, 10 Pages.

* cited by examiner

TECHNIQUES FOR LIMITING BLIND DECODING FOR MULTI-DCI BASED MULTI-TRANSMIT-RECEIVE POINTS

CROSS-REFERENCE TO RELATED APPLICATIONS

This application is a continuation of U.S. patent application Ser. No. 17/120,878 titled "TECHNIQUES FOR LIMITING BLIND DECODING FOR MULTI-DCI BASED MULTI-TRANSMIT-RECEIVE POINTS," filed Dec. 14, 2020, which is a continuation of U.S. Patent Application Number 16/930,003 titled "TECHNIQUES FOR LIMITING BLIND DECODING FOR MULTI-DCI BASED MULTI-TRANSMIT-RECEIVE POINTS," filed Jul. 15, 2020, which claims priority to U.S. Provisional Application No. 62/876,572 titled "TECHNIQUES FOR LIMITING BLIND DECODING FOR MULTI-DCI BASED MULTI-TRANSMIT-RECEIVE POINTS," filed Jul. 19, 2019, all of which are assigned to the assignee hereof, and incorporated herein by reference in their entirety.

BACKGROUND

Technical Field

The present disclosure relates generally to communication systems, and more particularly, to a control channel processing limiting blind decoding for multiple downlink control information (DCI) based multiple transmit-receive points (TRPs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, methods, non-transitory computer-readable mediums, and apparatuses (e.g., user equipment (UE)) are provided. A method of wireless communication may include determining, by a UE, whether to signal a number representing physical downlink control channel (PDCCH) monitoring capability across all downlink serving cells based at least in part on a multiplication factor for serving cells with two control resource set (CORESET) groups. The method may include receiving, by the UE, a configuration of serving cells indicating a number of configured downlink serving cells without CORESET grouping or with one CORESET group and a number of configured downlink serving cells with two CORESET groups. The method may include determining a limit of a number of serving cells based on one of: (i) the configuration and the multiplication factor in response to determining not to signal the number representing PDCCH monitoring capability, or (ii) the number representing PDCCH monitoring capability in response to determining to signal the number representing PDCCH monitoring capability. The method may include determining, by the UE, a total limit of PDCCH candidates and non-overlapped control channel elements (CCEs) to monitor in a slot for a cell group and a per cell limit of PDCCH candidates and non-overlapped CCEs to monitor in a slot per scheduled cell for cells without CORESET grouping or with one CORESET group and for cells with two CORESET groups based on the limit of the number of serving cells. The method may include receiving a downlink control channel within a slot by performing blind decoding operations on CCEs up to the total limit and up to the per cell limit.

In the above method, receiving the downlink control channel may further include, for a primary cell, excluding blind detections and control channel elements corresponding to common search space sets from the per cell limit for the primary cell. The method may include decoding a UE specific search space starting at a lowest index, and excluding a number of blind detections and CCEs used for the decoding of each index from the per cell limit of the primary cell. The method may include stopping the decoding when a number of configured blind detections or control channel elements for a next index is greater than a remaining number of PDCCH candidates or non-overlapped CCEs for the per cell limit of the primary cell.

In an aspect, the per cell limit for a cell with multiple TRPs includes a limit per CORESET group. The limit per CORESET group may be equal to the per cell limit for cells with two CORESET groups divided by the multiplication factor or may be equal to the per cell limit for cells without CORESET grouping or with one CORESET group.

In an aspect, determining, by a UE, whether to signal the number representing PDCCH monitoring capability across all downlink serving cells may include determining to signal the number when the UE is capable of receiving from a first number of cells without CORESET grouping or with one CORESET group plus the multiplication factor multiplied by a second number of cells with two CORESET groups that is greater than a threshold. The method may further include signaling the number representing PDCCH monitoring capability across all downlink serving cells with a value less than or equal to the first number of cells without CORESET grouping or with one CORESET group plus the multiplication factor multiplied by the second number of cells with two CORESET groups.

In an aspect, determining, by the UE, the limit of a number of serving cells based on the configuration and the multiplication factor may include determining the limit of the number of serving cells as the number of configured downlink serving cells with without CORESET grouping or with one CORESET group plus the multiplication factor multiplied by the number of configured downlink serving cells with two CORESET groups.

In an aspect, determining, by the UE, the total limit for the cell group and the per cell limit per scheduled cell for cells without CORESET grouping or with one CORESET group and for cells with two CORESET groups based on the limit of the number of serving cells may include: determining that the number of configured downlink serving cells without CORESET grouping or with one CORESET group plus the multiplication factor multiplied by the number of configured downlink serving cells with multiple TRPs is less than or equal to the limit of the number of serving cells; determining the per cell limit for cells without CORESET grouping or with one CORESET group as a value for a sub-carrier spacing (SCS) for a serving cell without CORESET grouping or with one CORESET group; and determining the per cell limit for multiple TRP cells as the multiplication factor multiplied by a value for the SCS for the serving cell without CORESET grouping or with one CORESET group.

In an aspect, determining, by the UE, determining, by the UE, the total limit and the per cell limit for cells without CORESET grouping or with one CORESET group and for cells with two CORESET groups based on the limit of the number of serving cells: determining that the number of configured downlink serving cells without CORESET grouping or with one CORESET group plus the multiplication factor multiplied by the number of configured downlink serving cells with two CORESET groups is greater than the limit of the number of serving cells; and determining the total limit for a cell group with a SCS as a floor of the limit of the number of serving cells multiplied by a value for the SCS for a serving cell without CORESET grouping or with one CORESET group, multiplied by a ratio of the number of configured downlink serving cells for the SCS without CORESET grouping or with one CORESET group plus the multiplication factor multiplied by the number of configured downlink serving cells for the SCS with two CORESET groups to a total number of configured downlink serving cells without CORESET grouping or with one CORESET group for the cell group plus the multiplication factor multiplied by a total number of configured downlink serving cells with two CORESET groups for the cell group. Determining, by the UE, determining, by the UE, the total limit and the per cell limit for cells without CORESET grouping or with one CORESET group and for cells with two CORESET groups based on the limit of the number of serving cells may include: determining the per cell limit for cells without CORESET grouping or with one CORESET group as a minimum of the value for the SCS for the serving cell without CORESET grouping or with one CORESET group and the total limit for the cell group for the SCS; and determining the per cell limit for cells with two CORESET groups as the minimum of the multiplication factor multiplied by the value for the SCS for the serving cell without CORESET grouping or with one CORESET group and the total limit for the cell group for the SCS In an aspect, where the UE determines not to signal the number representing PDCCH monitoring capability, and wherein the UE is capable of dual connectivity, wherein the UE reports a first number representing PDCCH monitoring capability for a master cell group (MCG) and a second number representing PDCCH monitoring capability for a secondary cell group (SCG), wherein a sum of the first number and the second number is greater than or equal to a first number of cells without CORESET grouping or with one CORESET group plus the multiplication factor multiplied by a second number of cells with two CORESET groups. The configuration may include a configured number representing PDCCH monitoring capability for the MCG and a configured number representing PDCCH monitoring capability for the SCG, a sum of the configured number representing PDCCH monitoring capability for the MCG and the configured number representing PDCCH monitoring capability for the SCG may be less than or equal to a first configured number of cells without CORESET grouping or with one CORESET group plus the multiplication factor multiplied by a second configured number of cells with two CORESET groups, and the limit of the number of serving cells may be based on the configured number representing PDCCH monitoring capability for the MCG and the configured number representing PDCCH monitoring capability for the SCG.

Alternatively, where the UE determines to signal the number representing PDCCH monitoring capability across all downlink serving cells, and where the UE is capable of dual connectivity, the UE may report a first number representing PDCCH monitoring capability for a MCG and a second number representing PDCCH monitoring capability for a secondary cell group (SCG), wherein a sum of the first number and the second number is greater than or equal to the number representing PDCCH monitoring capability across all downlink serving cells. The configuration may include a configured number representing PDCCH monitoring capability for the MCG and a configured number representing PDCCH monitoring capability for the SCG, wherein a sum of the configured number representing PDCCH monitoring capability for the MCG and the configured number representing PDCCH monitoring capability for the SCG is less than or equal to the number representing PDCCH monitoring capability across all downlink serving cells, and the limit of the number of serving cells is based on the configured number representing PDCCH monitoring capability for the MCG and the configured number representing PDCCH monitoring capability for the SCG.

In either alternative for NR-DC above, determining, by the UE, the total limit of blind decoding operations and control channel elements for a cell group may include separately determining the total limit of blind decoding operations and control channel elements for the MCG and the SCG.

In another aspect, the disclosure provides methods, non-transitory computer-readable mediums, and apparatuses (e.g., UEs) for wireless communication. The method of wireless communication may include determining, by a UE, whether to signal, a first number representing physical downlink control channel (PDCCH) monitoring capability across all downlink serving cells for a first CORESET group and a second number representing PDCCH monitoring capability across all downlink serving cells for a second CORESET group. The method may include receiving, by the UE, a configuration of serving cells indicating a number of configured downlink serving cells for the first CORESET group and a number of configured downlink serving cells for the second CORESET group. The method may include determining, by the UE, a limit of a number of serving cells for the first CORESET group based on the configuration or the first number and a limit of a number of serving cells for the second CORESET group based on the configuration or the second number. The method may include determining, by the UE, a first total limit of PDCCH candidates and non-overlapped CCEs to monitor in a slot for a cell group for the first CORESET group based on the limit of a number of serving cells for the first CORESET group and a first per cell limit of PDCCH candidates and non-overlapped CCEs to monitor in a slot per scheduled cell for the first CORESET group based on the limit of a number of serving cells for the first CORESET group. The method may include determining a second total limit of PDCCH candidates and non-overlapped CCEs to monitor in a slot for a cell group for the second CORESET group based on the number of serving cells for the second CORESET group and a second per cell limit of PDCCH candidates and non-overlapped CCEs to monitor in a slot per scheduled cell for the second CORESET group based on the number of serving cells for the second CORESET group. The method may include receiving a downlink control channel within a slot by performing blind decoding operations on CCEs up to the first total limit and up to the first per cell limit for the first CORESET group and on up to the second total limit and up to the second per cell limit for the second CORESET group.

In an aspect, receiving the downlink control channel may further include, for at least the first CORESET group for a primary cell: excluding blind detections and control channel elements corresponding to common search space sets from the first per cell limit for the primary cell; decoding a UE specific search space starting at a lowest index, and excluding a number of blind detections and CCEs used for the decoding for each index from the per cell limit of the primary cell; and stopping the decoding when a number of configured blind detections or control channel elements for a next index is greater than a remaining number of PDCCH candidates or non-overlapping CCEs for the per cell limit of the primary cell.

In another aspect, determining, by the UE, whether to signal the first number and the second number may include signaling the first number when the UE is capable of supporting more than a threshold number of downlink serving cells in which the first CORESET group is configured and signaling the second number when the UE is capable of supporting more than the threshold number of downlink serving cells in which the second CORESET group is configured.

In another aspect, determining, by a UE, whether to signal the first number and the second number comprises signaling both the first number and the second number when a number of serving cells that can be configured with the first CORESET group plus a number of serving cells that can be configured with the second CORESET group is greater than a threshold.

In another aspect, determining, by the UE, the number of serving cells for the first CORESET group and the number of serving cells for the second CORESET group based on the configuration comprises determining for each CORESET group, a number of configured downlink cells in which a respective CORESET with a higher layer index corresponding to the respective CORESET group is configured.

In another aspect, where the UE determines not to signal the first number and the second number, and where the UE is capable of dual connectivity, the UE may report a first number representing PDCCH monitoring capability and a second number representing PDCCH monitoring capability for a MCG and the first number and the second number for a SCG for each of the first CORESET and for the second CORESET, wherein a sum of the first number and the second number is greater than or equal to a maximum number of downlink cells on both the MCG and the SCG for a respective CORESET.

In another aspect, the configuration includes a configured number representing PDCCH monitoring capability for the MCG and a configured number representing PDCCH monitoring capability for the SCG for each of the first CORESET and the second CORESET groups, and determining, by the UE, the number of serving cells for a respective CORESET group may be based on the configured number representing PDCCH monitoring capability for the MCG and the configured number representing PDCCH monitoring capability for the SCG with a higher layer index indicating the respective CORESET group.

In an aspect, determining, by the UE, the total limit for the cell group and the per cell limit for the first CORESET group may include separately determining the total limit and the per cell limit for the MCG and for the SCG for the first CORESET group, and determining, by the UE, the total limit and the per cell limit per scheduled cell for the second CORESET group may include separately determining the total limit for the MCG and the SCG for the second CORESET group.

In another aspect, an apparatus for wireless communication, may include a memory; and at least one processor coupled to the memory. The at least one processor may be configured to determine whether to signal a number representing PDCCH monitoring capability across all downlink serving cells based at least in part on a multiplication factor, a number of serving cells with two CORESET groups, and number of serving cells without CORESET grouping or with one CORESET group. The at least one processor may be configured to receive a configuration of serving cells indicating a number of configured downlink serving cells without CORESET grouping or with one CORESET group and a number of configured downlink serving cells with two CORESET groups. The at least one processor may be configured to determine a limit of a number of serving cells based on the configuration and the multiplication factor when the number representing PDCCH monitoring capability is not signaled or based on the number representing PDCCH monitoring capability when signaled. The at least one processor may be configured to determine a total limit of PDCCH candidates and non-overlapped CCEs to monitor in a slot for a cell group and a per cell limit of PDCCH candidates and non-overlapped CCEs to monitor in a slot per scheduled cell for cells without CORESET grouping or with one CORESET group and for cells with two CORESET groups based on the limit of the number of serving cells. The at least one processor may be configured to receive a downlink control channel within a slot by performing blind decoding operations on CCEs up to the total limit and up to the per cell limit.

In another aspect, the disclosure provides a UE for wireless communication including means for determining whether to signal a number representing PDCCH monitoring capability across all downlink serving cells based at least in part on a multiplication factor, a number of serving cells with two CORESET groups, and number of serving cells without CORESET grouping or with one CORESET group. The UE may include means for receiving a configuration of serving cells indicating a number of configured downlink serving cells without CORESET grouping or with one CORESET group and a number of configured downlink serving cells with two CORESET groups. The UE may include means for determining a limit of a number of serving cells based on the configuration and the multiplication factor when the number representing PDCCH monitoring capability is not signaled or based on the number representing PDCCH monitoring capability when signaled. The UE may include means for determining a total limit of PDCCH candidates and non-overlapped CCEs to monitor in a slot for a cell group and a per cell limit of PDCCH candidates and non-overlapped CCEs to monitor in a slot per scheduled cell for cells without CORESET grouping or with one CORESET group and for cells with two CORESET groups based on the limit of the number of serving cells. The UE may include means for receiving a downlink control channel within a slot by performing blind decoding operations on CCEs up to the total limit and up to the per cell limit.

In another aspect, the disclosure provides a non-transitory computer-readable medium storing computer executable code. The code when executed by a processor causes the processor to determine, by a UE, whether to signal a number representing PDCCH monitoring capability across all downlink serving cells based at least in part on a multiplication factor, a number of serving cells with two CORESET groups, and number of serving cells without CORESET grouping or with one CORESET group. The code when executed by a processor causes the processor to receive, by the UE, a configuration of serving cells indicating a number of configured downlink serving cells without CORESET grouping or with one CORESET group and a number of configured downlink serving cells with two CORESET groups. The code when executed by a processor causes the processor to determine, by the UE, a limit of a number of serving cells based on the configuration and the multiplication factor when the number representing PDCCH monitoring capability is not signaled or based on the number representing PDCCH monitoring capability when signaled. The code when executed by a processor causes the processor to determine, by the UE, a total limit of PDCCH candidates and non-overlapped CCEs to monitor in a slot for a cell group and a per cell limit of PDCCH candidates and non-overlapped CCEs to monitor in a slot per scheduled cell for cells without CORESET grouping or with one CORESET group and for cells with two CORESET groups based on the limit of the number of serving cells. The code when executed by a processor causes the processor to receive, by the UE, a downlink control channel within a slot by performing blind decoding operations on CCEs up to the total limit and up to the per cell limit.

In another aspect, the disclosure provides a UE for wireless communication including a memory; and at least one processor coupled to the memory. The at least one processor may be configured to determine whether to signal a first number representing PDCCH monitoring capability across all downlink serving cells for a first CORESET group and a second number representing PDCCH monitoring capability across all downlink serving cells for a second CORESET group. The at least one processor may be configured to receive a configuration of serving cells indicating a number of configured downlink serving cells for the first CORESET group and a number of configured downlink serving cells for the second CORESET group. The at least one processor may be configured to determine a limit of a number of serving cells for the first CORESET group based on the configuration or the first number and a limit of a number of serving cells for the second CORESET group based on the configuration or the second number. The at least one processor may be configured to determine a first total limit of PDCCH candidates and non-overlapped control channel elements (CCEs) to monitor in a slot for a cell group for the first CORESET group based on the limit of the number of serving cells for the first CORESET group and a first per cell limit of PDCCH candidates and non-overlapped CCEs to monitor in a slot per scheduled cell for the first CORESET group based on the limit of the number of serving cells for the first CORESET group. The at least one processor may be configured to determine a second total limit of PDCCH candidates and non-overlapped CCEs to monitor in a slot for a cell group for the second CORESET group based on the limit of the number of serving cells for the second CORESET group and a second per cell limit of PDCCH candidates and non-overlapped CCEs to monitor in a slot per scheduled cell for the second CORESET group based on the limit of the number of serving cells for the second CORESET group. The at least one processor may be configured to receive a downlink control channel within a slot by performing blind decoding operations on CCEs up to the first total limit and up to the first per cell limit for the first CORESET group and on up to the second total limit and up to the second per cell limit for the second CORESET group.

In an aspect, the disclosure provides a UE for wireless communication, including means for determining whether to signal a first number representing PDCCH monitoring capability across all downlink serving cells for a first CORESET group and a second number representing PDCCH monitoring capability across all downlink serving cells for a second CORESET group. The UE may include means for receiving a configuration of serving cells indicating a number of configured downlink serving cells for the first CORESET group and a number of configured downlink serving cells for the second CORESET group. The UE may include means for determining a limit of a number of serving cells for the first CORESET group based on the configuration or the first number and a limit of a number of serving cells for the second CORESET group based on the configuration or the second number. The UE may include means for determining a first total limit of PDCCH candidates and non-overlapped control channel elements (CCEs) to monitor in a slot for a cell group for the first CORESET group based on the limit of the number of serving cells for the first CORESET group and a first per cell limit of PDCCH candidates and non-overlapped CCEs to monitor in a slot per scheduled cell for the first CORESET group based on the limit of the number of serving cells for the first CORESET group. The UE may include means for determining a second total limit of PDCCH candidates and non-overlapped CCEs to monitor in a slot for a cell group for the second CORESET group based on the limit of the number of serving cells for the second CORESET group and a second per cell limit of PDCCH candidates and non-overlapped CCEs to monitor in a slot per scheduled cell for the second CORESET group based on the limit of the number of serving cells for the second CORESET group. The UE may include means for receiving a downlink control channel within a slot by performing blind decoding operations on CCEs up to the first total limit and up to the first per cell limit for the first CORESET group and on up to the second total limit and up to the second per cell limit for the second CORESET group.

In an aspect, the disclosure provides a non-transitory computer-readable medium storing computer executable code. The code when executed by a processor causes the processor to determine, by a UE, whether to signal, a first number representing PDCCH monitoring capability across all downlink serving cells for a first CORESET group and a second number representing PDCCH monitoring capability across all downlink serving cells for a second CORESET group. The code when executed by a processor causes the processor to receive, by the UE, a configuration of serving cells indicating a number of configured downlink serving cells for the first CORESET group and a number of configured downlink serving cells for the second CORESET group. The code when executed by a processor causes the processor to determine, by the UE, a limit of a number of serving cells for the first CORESET group based on the configuration or the first number and a limit of a number of serving cells for the second CORESET group based on the configuration or the second number. The code when executed by a processor causes the processor to determine, by the UE, a first total limit of PDCCH candidates and non-overlapped CCEs to monitor in a slot for a cell group for the first CORESET group based on the limit of the number of serving cells for the first CORESET group and a first per cell limit of PDCCH candidates and non-overlapped CCEs to monitor in a slot per scheduled cell for the first CORESET group based on the limit of the number of serving cells for the first CORESET group. The code when executed by a processor causes the processor to determine, by the UE, a second total limit of PDCCH candidates and non-overlapped CCEs to monitor in a slot for a cell group for the second CORESET group based on the limit of the number of serving cells for the second CORESET group and a second per cell limit of PDCCH candidates and non-overlapped CCEs to monitor in a slot per scheduled cell for the second CORESET group based on the limit of the number of serving cells for the second CORESET group. The code when executed by a processor causes the processor to receive, by the UE, a downlink control channel within a slot by performing blind decoding operations on CCEs up to the first total limit and up to the first per cell limit for the first CORESET group and on up to the second total limit and up to the second per cell limit for the second CORESET group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
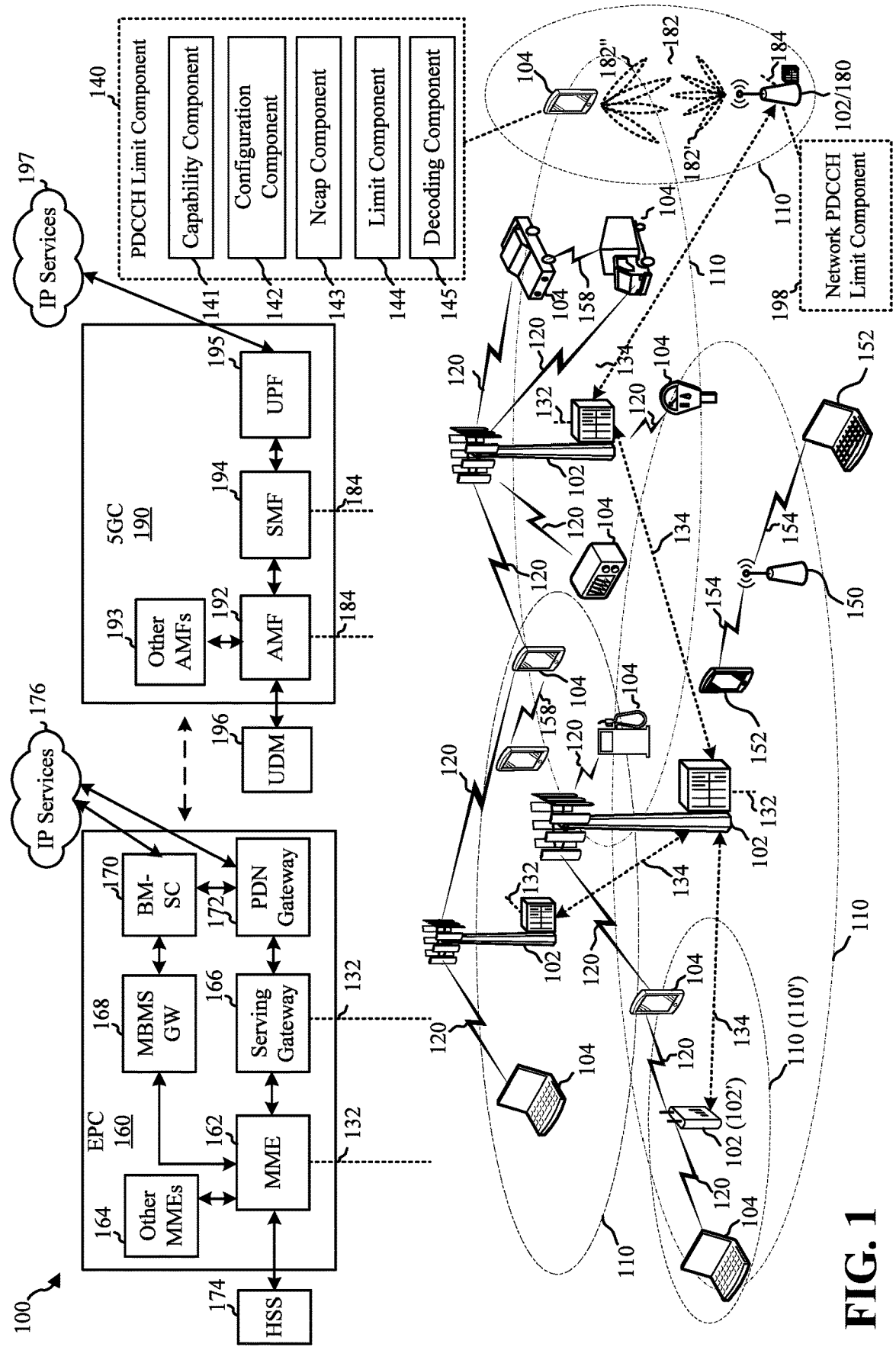
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

An access network may utilize multiple transmit-receive points (TRPs) for a single cell. In some deployments, a separate downlink control information (DCI) may be used to schedule a downlink transmission from each TRP. For example, in the case of two TRPs, a first DCI transmitted from a first TRP may schedule a first physical downlink shared channel (PDSCH) transmitted from the first TRP, and a second DCI transmitted from the second TRP may schedule a second PDSCH transmitted from the second TRP. The use of multiple TRPs may be defined for a specific serving cell such that one or more cells may be configured with multiple TRPs while other serving cells may be configured with single TRP. The multiple TRPs may operate in the same active bandwidth part (BWP) with the same sub-carrier spacing (SCS). In order to determine the PDSCH transmissions, a UE may monitor a set of PDCCH candidates in one or more control resource sets (CORESETs). Each CORESET may include multiple control channel elements (CCE) defining a search space set. A non-overlapped CCE may refer to a unique CCE that does not use the same time and frequency domain resources as another CCE. The search space may include a common search space (CSS) and a UE-specific search space (USS). The monitoring of the set of PDCCH candidates in one or more CORESETs may be referred to as blind decoding as the UE may not know which DCI format is being received and may decode each PDCCH candidate according to the monitored DCI formats.

The utilization of multiple TRPs and multiple DCIs may increase the resources needed for PDCCH decoding. In an aspect, a maximum number of CORESETs may be increased (e.g., to 5 CORESETS) over Release 15 of 5G-NR to accommodate additional DCIs. Additionally, higher layer signaling may indicate an index per CORESET, which may group the CORESETS based on TRP. A serving cell configured with two CORESET groups may be referred to as a multiple TRP cell or multi-TRP cell. A serving cell configured without CORESET grouping or with one CORESET group may be referred to as a single TRP cell. Generally, however, the use of multiple TRPs may be transparent to a UE.

PDCCH reception may be subject to limits based on UE capability. As a wireless device employs a blind detection algorithm for downlink control channel decoding, prior information of the maximum number of downlink control channels transmitted from multi-TRPs to detect is useful to reduce the downlink control channel searching time. When configured with multiple TRPs, each scheduling a data packet, the UE can stop the blind decoding when the UE reaches a defined limit on a number of PDCCH candidates or non-overlapped CCEs. Otherwise (e.g., if there is no defined limit for the UE), the UE may perform blind decoding for all possibilities of downlink control channel candidates across the search space(s). Conventionally, UE decoding capabilities have been based on a number of cells.

Since multi-TRP communications may increase the number of PDCCH candidates without increasing the number of cells, new limits for multi-TRP communications may be defined. For example, a PDCCH monitoring capability across all downlink serving cells may account for multiple-TRP cells and for carrier aggregation and dual connectivity using a multiplication factor. Further, a limit determined by the network and the UE based on the capability and a configuration may account for multiple-TRP cells and for carrier aggregation and dual connectivity using a multiplication factor. Finally, overbooking procedures for primary cells without configured limits may define UE decoding operations.

In an aspect, in a first implementation, a UE may determine whether to signal a number representing a PDCCH monitoring capability across all downlink serving cells based on a multiplication factor (r) for serving cells with multiple transmit-receive points (TRPs) compared to serving cells with a single TRP. The UE may receive a configuration of serving cells indicating a number of configured downlink serving cells with single TRP and a number of configured downlink serving cells with multiple TRPs. The UE may determine a limit of a number of serving cells (Ncap) based on the configuration and the multiplication factor when the number is not signaled or based on the number when signaled. The UE may determine a total limit of PDCCH candidates and non-overlapped CCEs to monitor in a slot for a cell group and a per cell limit of PDCCH candidates and non-overlapped CCEs to monitor in a slot per scheduled cell for single TRP cells and for multiple TRP cells based on the Ncap. The UE may receive a downlink control channel within a slot by performing blind decoding operations on CCEs up to the total limit and up to the per cell limit.

In another aspect, for a second implementation, a UE may determine whether to signal a first number representing PDCCH monitoring capability across all downlink serving cells for a first CORESET group and a second number representing PDCCH monitoring capability across all downlink serving cells for a second CORESET group. The UE may receive a configuration of serving cells indicating a number of configured downlink serving cells for the first CORESET group and a number of configured downlink serving cells for the second CORESET group. The UE may determine a limit of a number of serving cells for the first CORESET group (Ncap0) based on the configuration or the first number, and determine a limit of a number of serving cells for the second CORESET group (Ncap1) based on the configuration or the second number. The UE may determine a first total limit of PDCCH candidates and non-overlapped CCEs to monitor in a slot for a cell group for the first CORESET group based on Ncap0 and a first per cell limit of PDCCH candidates and non-overlapped CCEs to monitor in a slot per scheduled cell for the first CORESET group based on Ncap0. The UE may determine a second total limit of PDCCH candidates and non-overlapped CCEs to monitor in a slot for a cell group for the second CORESET group based on Ncap1 and a second per cell limit of PDCCH candidates and non-overlapped CCEs to monitor in a slot per scheduled cell for the second CORESET group based on Ncap1. The UE may receive a downlink control channel within a slot by performing blind decoding operations on CCEs up to the first total limit and up to the first per cell limit for the first CORESET group and on up to the second total limit and up to the second per cell limit for the second CORESET group.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may also be referred to as a non-transitory computer-readable medium. The term non-transitory computer-readable medium excludes transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 in which limits for blind decoding of a search space are implemented. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

In an aspect, one or more of the UEs 104 may include a PDCCH limit component 140 for determining a limit on a number of PDCCH candidates and/or a limit on a number of non-overlapped CCEs to be used for blind decoding of a search space. The PDCCH limit component 140 may include a capability component 141 that signals zero or more UE capabilities related to PDCCH reception, a configuration component 142 that receives a cell configuration for the access network 100 including one or more serving cells (e.g., base stations 102), a Ncap component 143 that determines a limit on a number of serving cells (Ncap), a limit component 144 that determines the limit on the number of PDCCH candidates and/or the limit on the number of non-overlapped CCEs based on the Ncap, and a decoding component 145 that performs blind decoding operations for PDCCH candidates on the CCEs up to the limits.

In a first implementation, the PDCCH limit component 140 may define limits based on a number of serving cells, but may increase a weight for multiple-TRP cells using a multiplication factor (r). The value of r may be between 1 and 2 inclusive for configurations with up to two TRPs in a given serving cell corresponding to two CORESET groups. For more than two TRPs/CORESET groups the conditions may be different (e.g., the value of r may be greater). The capability component 141 may determine whether to signal a number (X) representing PDCCH monitoring capability across all downlink serving cells based on the multiplication factor (r) for serving cells with multiple transmit-receive points (TRPs) compared to serving cells with a single TRP. The configuration component 142 may receive a configuration of serving cells indicating a number (a) of configured downlink serving cells with single TRP and a number (b) of configured downlink serving cells with multiple TRPs. The Ncap component 143 may determine a limit of a number of serving cells (Ncap) based on the configuration and the multiplication factor when the number is not signaled or based on the number when signaled. The limit component 144 may determine a total limit of PDCCH candidates and non-overlapped control channel elements (CCEs) to monitor in a slot for a cell group and a per cell limit of PDCCH candidates and non-overlapped CCEs to monitor in a slot per scheduled cell for single TRP cells and for multiple TRP cells based on the Ncap. The decoding component 145 may receive a downlink control channel within a slot by performing blind decoding operations on CCEs up to the total limit and up to the per cell limit.

In a second implementation, the PDCCH limit component 140 may define limits per CORESET group across all downlink cells. The capability component 141 may determine whether to signal a first number (X0) representing PDCCH monitoring capability across all downlink serving cells for a first CORESET group and a second number (X1) representing PDCCH monitoring capability across all downlink serving cells for a second CORESET group. The configuration component 142 may receive a configuration of serving cells indicating a number of configured downlink serving cells for the first CORESET group and a number of configured downlink serving cells for the second CORESET group. The Ncap component 143 may determine a limit of a number of serving cells for the first CORESET group (Ncap0) based on the configuration or the first number (X0) and a limit of a number of serving cells for the second CORESET group (Ncap1) based on the configuration or the second number (X1). The limit component 144 may determine a first total limit of PDCCH candidates and non-overlapped CCEs to monitor in a slot for a cell group for the first CORESET group based on Ncap0 and a first per cell limit of PDCCH candidates and non-overlapped CCEs to monitor in a slot per scheduled cell for the first CORESET group based on Ncap0. The limit component 144 may also determine a second total limit of PDCCH candidates and non-overlapped CCEs to monitor in a slot for a cell group for the second CORESET group based on Ncap1 and a second per cell limit of PDCCH candidates and non-overlapped CCEs to monitor in a slot per scheduled cell for the second CORESET group based on Ncap1. The decoding component 145 may receive a downlink control channel within a slot by performing blind decoding operations on CCEs up to the first total limit and up to the first per cell limit for the first CORESET group and up to the second total limit and up to the second per cell limit for the second CORESET group.

In an aspect, one or more of base station 102 may include a network PDCCH limit component 198 that may operate in conjunction with the PDCCH limit component 140 to determine the limits discussed above. In particular, the network PDCCH limit component 198 may receive any capabilities signaled by the UE 104 and may transmit the configuration of serving cells. The network PDCCH limit component 198 may determine Ncap, the total limits, and the per cell limits in the same manner as discussed above for the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
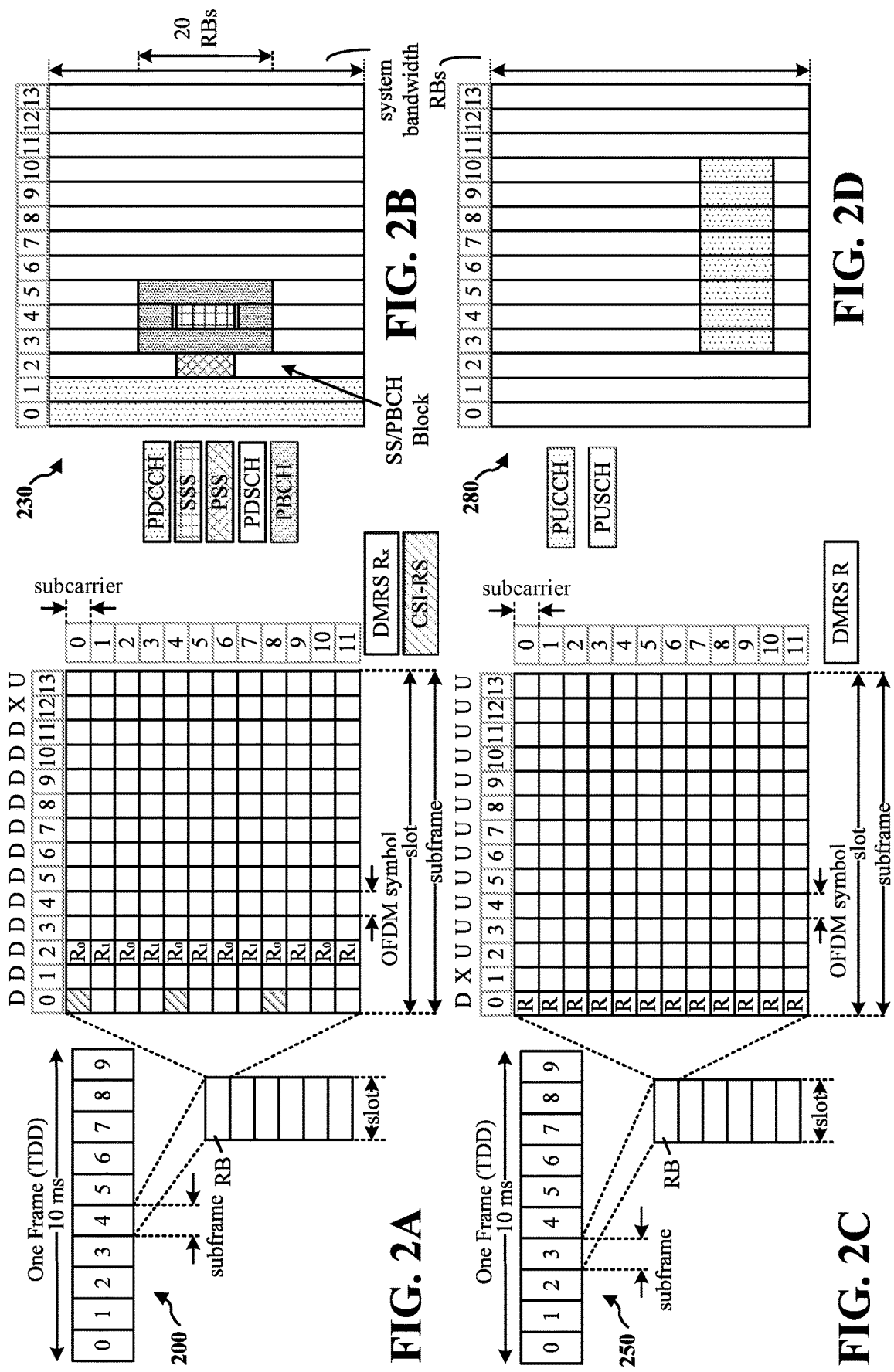
FIG. 2A is a diagram illustrating an example of a first frame, in accordance with certain aspects of the present description.
FIG. 2B is a diagram illustrating an example of DL channels within a subframe, in accordance with certain aspects of the present description.
FIG. 2C is a diagram illustrating an example of a second frame, in accordance with certain aspects of the present description.
FIG. 2D is a diagram illustrating an example of a subframe, in accordance with certain aspects of the present description.

FIGS. 2A-2D are resource diagrams illustrating example frame structures and resources that may be used by communications between the UE 104 and the base station 102 of FIG. 1. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu$ * 15 kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
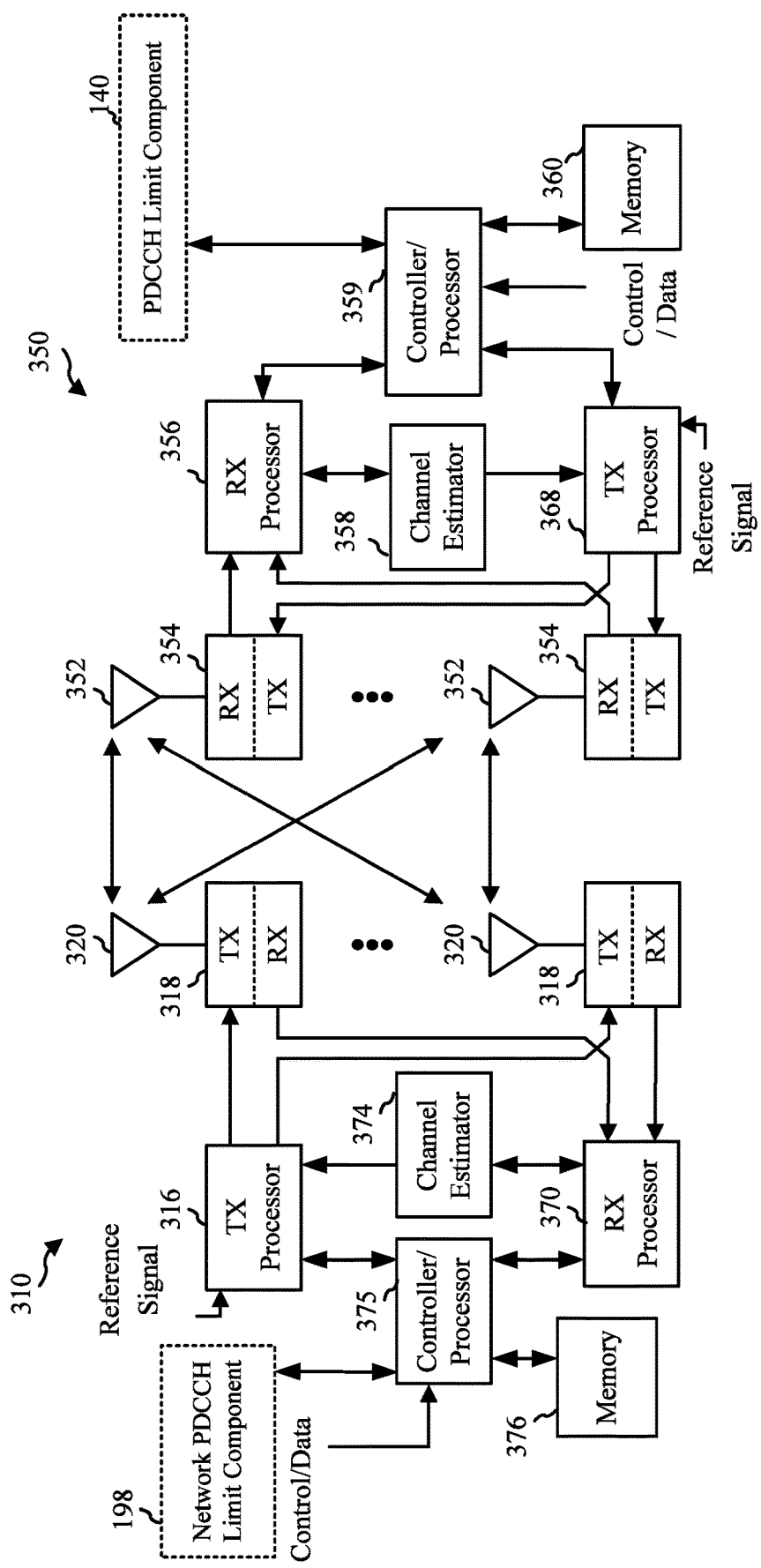
FIG. 3 is a diagram illustrating an example of a base station and user equipment (UE) in an access network, in accordance with certain aspects of the present description.

FIG. 3 is a block diagram of a base station 310 including a network PDCCH limit component 198 in communication with a UE 350 including a PDCCH limit component 140 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PDCCH limit component 140 of FIG. 1.

Figure 4:
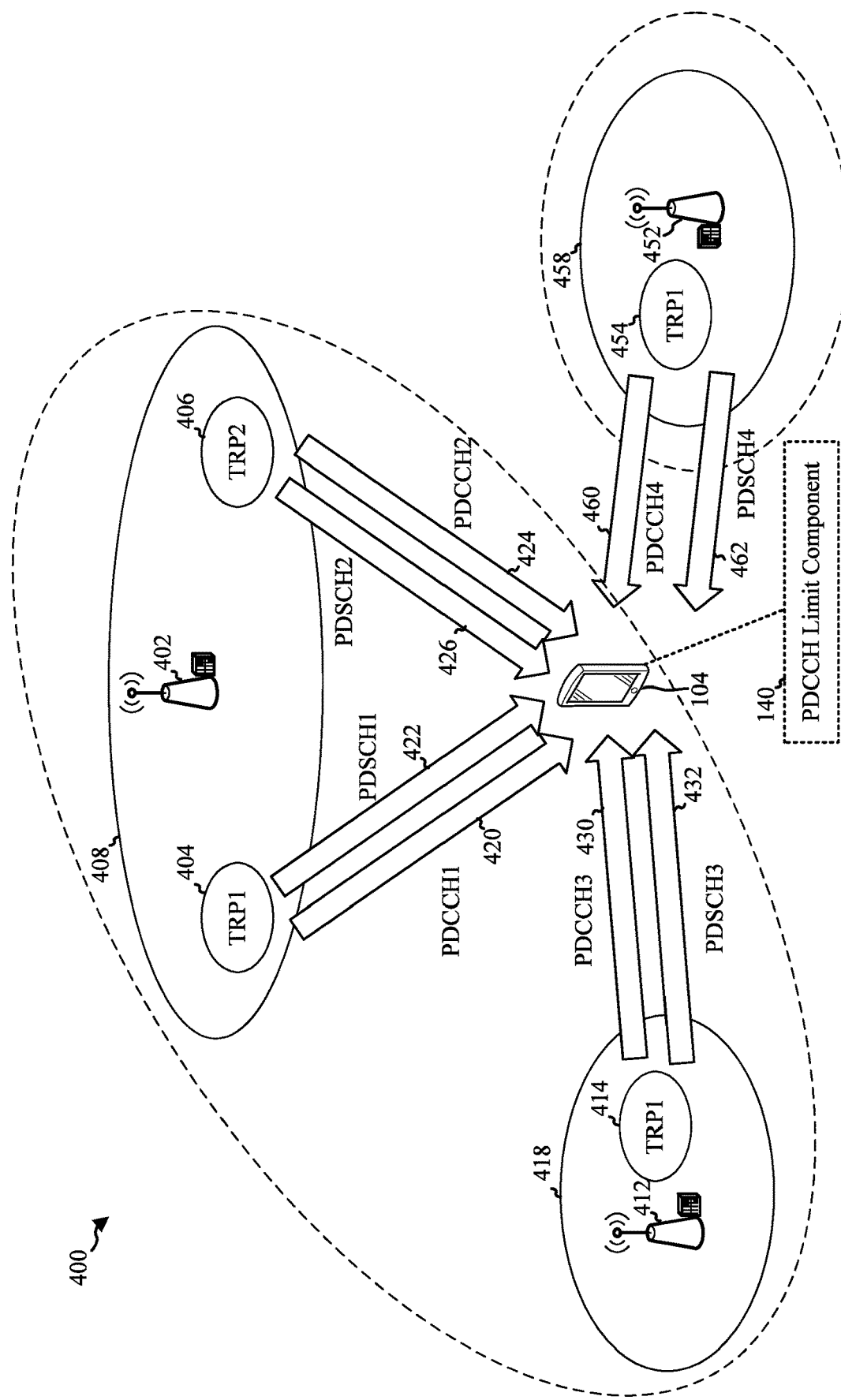
FIG. 4 is a schematic diagram illustrating an example configuration of serving cells for a UE, in accordance with certain aspects of the present description.

FIG. 4 is an example cell configuration 400 including a multiple TRP cell 408 and a single TRP cell 418 for a UE 104 including a PDCCH limit component 140. The multiple TRP cell 408 may be controlled by a base station 402 and may include a first TRP 404 and a second TRP 406. The first TRP 404 may transmit a first PDCCH1 420 that schedules a first PDSCH1 422. The second TRP 406 may transmit a second PDCCH1 424 that schedules a second PDSCH 426. The single TRP cell 418 may be controlled by a base station 412 and include a single TRP 414. The single TRP 414 may transmit a third PDCCH3 430 scheduling a third PDSCH 432. In an aspect, the multiple TRP cell 408 and a single TRP cell 418 may form a master cell group (MCG). Additionally, the cell configuration 400 may include a secondary cell group (SCG), which may include, for example, a single TRP cell 458. The single TRP cell 458 may be controlled by a base station 452 and include a single TRP 454. The single TRP 454 may transmit a third PDCCH4 460 scheduling a third PDSCH 462. The cell configuration 400 may include additional cells (not shown) that may each be a single TRP cell or a multiple TRP cell and may transmit a respective PDCCH from each TRP.

In an aspect, all of the PDCCH 420, 424, 430, and 460 may be received in the same slot depending on UE capabilities and limits. In an aspect, multiple PDCCH transmissions may allow scheduling of greater amounts of data, thereby increasing the data rate for the UE 104. The UE 104, however, may be constrained (e.g., by hardware limits) on the amount of PDCCH processing that may be performed. If the UE 104 were to determine capabilities or limits based on only a number of serving cells, the UE 104 may not accurately account for additional PDCCHs that may be transmitted by multiple TRP cells using multiple DCIs, and the UE 104 would be unable to decode all of the configured PDCCHs in some cases. The PDCCH limit component 140 may signal capabilities and determine limits taking into account multiple TRP cells such that the UE 104 may decode the PDCCHs for which it is configured.

Figure 5:
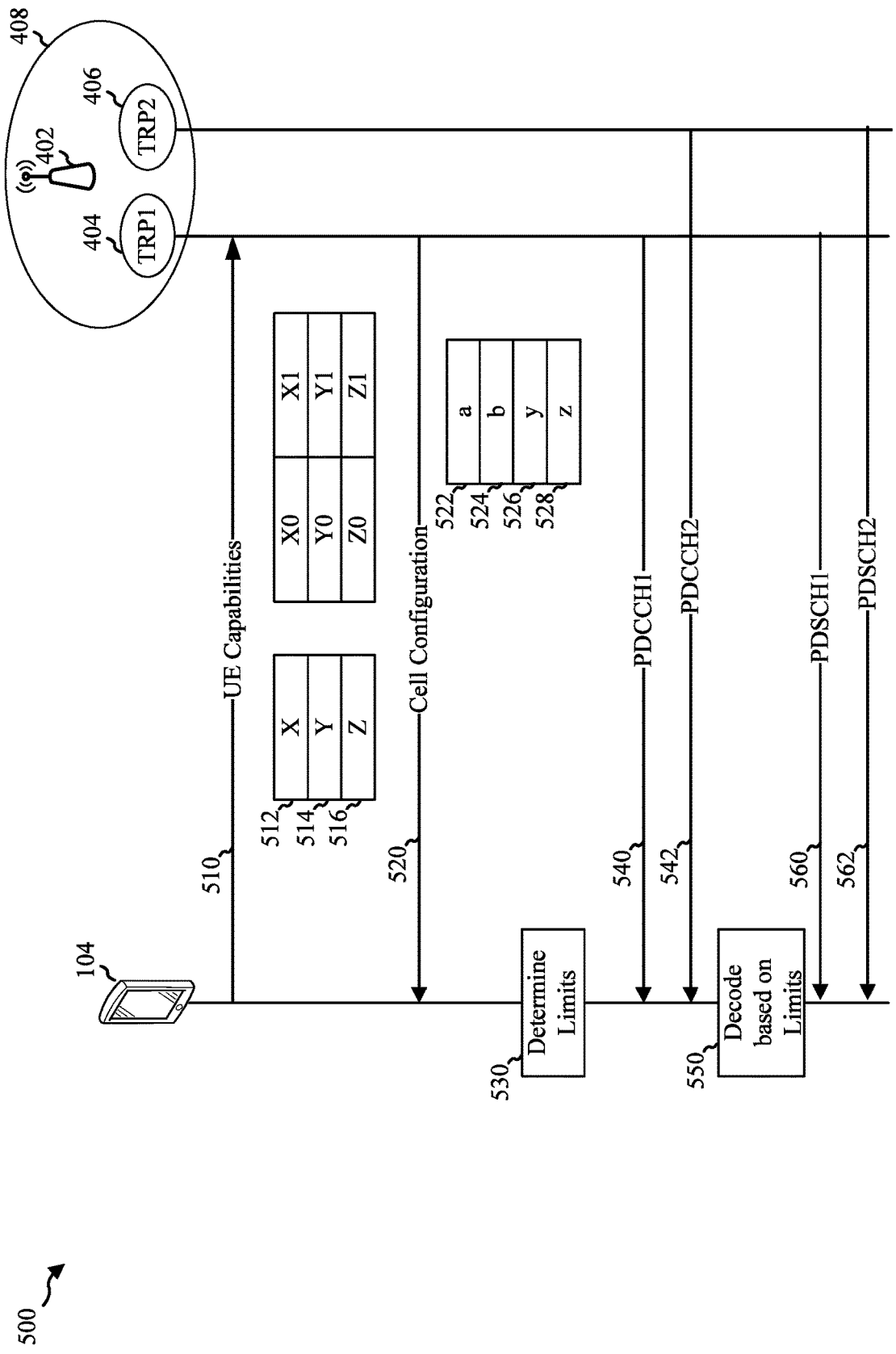
FIG. 5 is a message diagram including communications and processing by a UE and base station for determining PDCCH reception limits, in accordance with certain aspects of the present description.

FIG. 5 is a message diagram 500 illustrating example messages that may be transmitted between a UE 104 and a base station 402, which may be a multiple TRP cell 408 including a first TRP 404 and a second TRP 406, for establishing limits for blind decoding of PDCCH.

The UE 104 may transmit UE capabilities 510 that are related to PDCCH processing. For example, the UE capabilities 510 may include a number (X) 512 representing PDCCH monitoring capability across all downlink serving cells. The number X may be referred to as pdcch-BlindDetectionCA. The UE 104 may determine whether to transmit X 512 based on whether is the UE 104 is capable of supporting a threshold number (e.g., 4) of downlink serving cells. When the UE 104 is capable of dual connectivity, the UE 104 may transmit a number (Y) 514 representing PDCCH monitoring capability for a MCG and a number (Z) 516 representing PDCCH monitoring capability for a SCG. The number Y 514 may be referred to as pdcch-BlindDetectionMCG-UE and the number Z 516 may be referred to as pdcch-BlindDetectionSCG-UE. In an implementation where the UE separately signals values for each CORESET group, the number X may include X0 and X1, the number Y may include Y0 and Y1, and the number Z may include Z0 and Z1.

The base station 402 may transmit a cell configuration 520 that may configure the UE 104 with a plurality of serving cells. For example, the cell configuration 520 may include or may indicate a number of single TRP cells (a) 512 and a number of multiple TRP cells (b) 514. When the UE 104 is capable of dual connectivity, the cell configuration 520 may include a number (y) 526 representing configured PDCCH monitoring capability for the MCG and a number (z) 528 representing configured PDCCH monitoring capability for the SCG. The number (y) 526 may be referred to as pdcch-BlindDetectionMCG and the number (z) 528 may be referred to as pdcch-BlindDetectionSCG.

At block 530, the UE 104 may determine limits on PDCCH reception. For example, the UE 104 may determine a total limit of PDCCH candidates and non-overlapped CCEs to monitor in a slot for a cell group. A maximum number of monitored PDCCH candidates for an SCS may be referred to as $M_{PDCCH}^{max,slot,\mu}$. $M_{PDCCH}^{max,slot,\mu}$ may be determined based on the following table:

TABLE 10.1-2

Maximum number $M_{PDCCH}^{max,slot,\mu}$ of monitored PDCCH candidates per slot for a DL BWP with SCS configuration $\mu \in \{0, 1,2,3\}$ for a single serving cell

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

A maximum number of the number of non-overlapped CCEs may be referred to as $C_{PDCCH}^{max,slot,\mu}$. $C_{PDCCH}^{max,slot,\mu}$ may be determined based on the following table:

TABLE 10.1-3

Maximum number $C_{PDCCH}^{max,slot,\mu}$ of non-overlapped CCEs per slot for a DL BWP with SCS configuration $\mu \in \{0, 1,2,3\}$ for a single serving cell

| $\mu$ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

As discussed in further detail below, in the present application, the limits may account for multiple TRP cells as opposed to a single serving cell with a single TRP. In the first implementation, a total monitoring limit may apply to all serving cells in a cell group. In the case of dual connectivity, there may be separate total monitoring limits for the MCG and for the SCG. In the second implementation, the total monitoring limit may apply to serving cells in a cell group configured for a CORESET group. Accordingly, the UE 104 may determine a separate total monitoring limit for each CORESET group. In the case of dual connectivity, the UE 104 may also determine a separate total monitoring limit for each CORESET group for the MCG and for the SCG. Accordingly, in the case of two CORESET groups and dual connectivity, the UE 104 may determine four (4) separate total monitoring limits. The UE 104 may also determine a per cell monitoring limit. In the first implementation, the per cell monitoring limit for multiple TRP cells may be based on the multiplication factor. In the second implementation, the UE 104 may determine a per cell monitoring limit for each CORESET group. Accordingly, a multiple TRP cell using two CORESET groups may be associated with two per cell monitoring limits.

The base station 102 may transmit a first PDCCH 540 and a second PDCCH 542, and the UE 104 may receive the first PDCCH 540 and the second PDCCH 542 as well as other PDCCH transmitted by other serving cells based on the limits determined in block 530. In an aspect, the network may be aware of the limits based the UE capabilities 510 and the cell configuration 520 and may avoid transmitting PDCCH that would exceed the limits of the UE. In an aspect, however, a primary serving cell may use overbooking to configure the UE 104 with PDCCH candidates that may result in exceeding the limits on PDCCH candidates and/or non-overlapped CCEs.

At block 550, the UE 104 may perform decoding based on the limits. That is, the UE 104 may decode PDCCH candidates up to the limit of PDCCH candidates (e.g., $M_{PDCCH}^{max,slot,\mu}$) on up to the limit of non-overlapped CCEs (e.g., $C_{PDCCH}^{max,slot,\mu}$). In the case of overbooking, even if the UE 104 is configured with PDCCH candidates that exceed the limit (e.g., based on the number and aggregation levels of the configured search spaces), the UE 104 may abide by the limits and stop decoding when one or more of the limits is reached.

The base station 402 may transmit a first PDSCH 560 and a second PDSCH 562 from the first TRP 404 and the second TRP 406, respectively. The UE 104 may receive the first PDSCH 560 and the second PDSCH 562 based on the decoded PDCCHs 540, 542.

Figure 6:
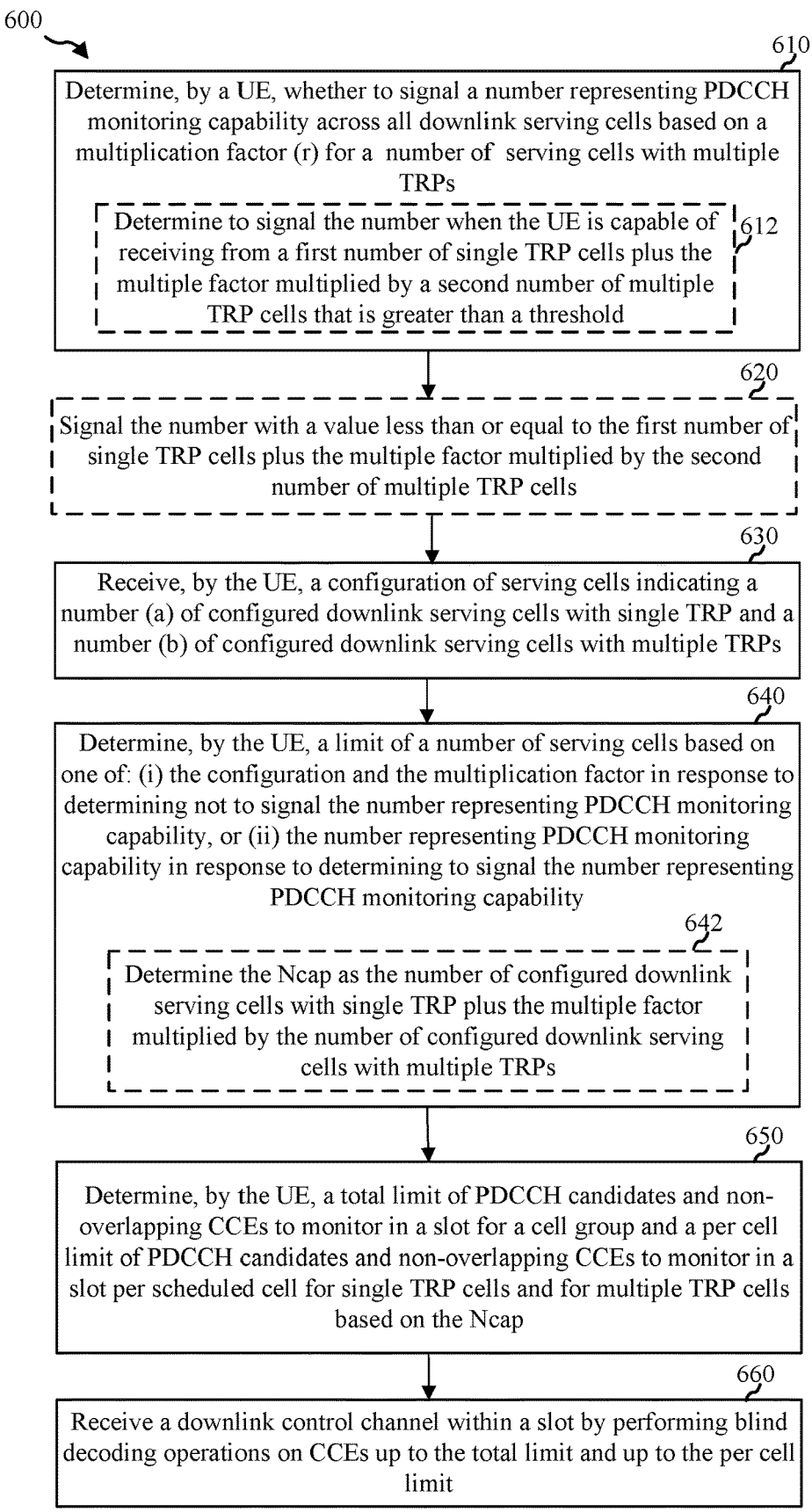
FIG. 6 is a flowchart of a first example method of wireless communication according to PDCCH decoding limits based on a multiplication factor, in accordance with certain aspects of the present description.

FIG. 6 is a flowchart of a method 600 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for establishing limits for blind decoding of PDCCH.

In block 610, the method 600 may include determining, by a UE, whether to signal a number (X) representing PDCCH monitoring capability across all downlink serving cells based at least in part on a multiplication factor (r) for serving cells with multiple TRPs (e.g., cells with two CORESET groups. In an aspect, for example, the UE 104, and/or the controller/processor 359 may execute the PDCCH limit component 140 and/or the capability component 141 to determine whether to signal the number (X) 512 representing PDCCH monitoring capability across all downlink serving cells based at least in part on the multiplication factor (r), the number of serving cells with multiple TRPs (e.g., cell 408), and the number of serving cells with a single TRP (e.g., cell 418). Accordingly, the UE 104, and/or the controller/processor 359 executing the PDCCH limit component 140 and/or the capability component 141 may provide means for determining whether to signal a number representing PDCCH monitoring capability across all downlink serving cells based at least in part on a multiplication factor for serving cells with two CORESET groups.

For example, at sub-block 612, the block 610 may include determining to signal the number (X) when the UE is capable of receiving from a first number of single TRP cells plus the multiplication factor multiplied by a second number of multiple TRP cells that is greater than a threshold. For example, the UE 104 may signal the value of X, if the UE 104 indicates capability of A or more serving cells with single-TRP and B or more serving cells with multiple-TRP such that A+rB>4. If A+rB≤4, the UE 104 may refrain from signaling the number X. If the UE is capable of NR-DC, the UE 104 may determine a first number representing PDCCH monitoring capability for a MCG (Y) and a second number representing PDCCH monitoring capability for a SCG (Z). If the UE 104 reports X, when the UE signals Y and Z, the value of Y+Z may be greater than the value of X. If the UE 104 does not report X, the sum of Y and Z may be greater than or equal to the value A+rB that the UE 104 may be configured with in both MCG and SGC.

In block 620, the method 600 may optionally include signaling the number (X) with a value less than or equal to the first number of single TRP cells plus the multiplication factor multiplied by a second number of multiple TRP cells that the UE is capable of supporting. In an aspect, for example, the UE 104, and/or the controller/processor 359 may execute the PDCCH limit component 140 and/or the capability component 141 to signal the number X 512 with a value less than or equal to the first number of single TRP cells plus the multiplication factor multiplied by the second number of multiple TRP cells. The block 620 may be performed in response to the sub-block 612. If the UE 104 is capable of NR-DC, the UE may also report Y 514 and Z 516. Accordingly, the UE 104, and/or the controller/processor 359 executing the PDCCH limit component 140 and/or the capability component 141 may provide means for signaling the number representing PDCCH monitoring capability across all downlink serving cells with a value less than or equal to the first number of single TRP cells plus the multiplication factor multiplied by the second number of multiple TRP cells.

In block 630, the method 600 may include receiving, by the UE, a configuration of serving cells indicating a number (a) of configured downlink serving cells with single TRP and a number (b) of configured downlink serving cells with multiple TRPs. In an aspect, for example, the UE 104, and/or the controller/processor 359 may execute the PDCCH limit component 140 and/or the configuration component 142 to receive the cell configuration 520 of serving cells indicating a number (a) 522 of configured downlink serving cells with single TRP and a number (b) 524 of configured downlink serving cells with multiple TRPs. When the UE 104 is configured for NR-DC, the cell configuration 520 may also include the number y 526 and the number z 528. The number y 526 is less than or equal to the number Y 514. The number z 528 is less than or equal to the number Z 516. That is the configured capabilities may be less than or equal to the reported capabilities. Further, if the UE 104 reported X 512, the number y 526 plus the number z 528 is less than or equal to X 512. If the UE 104 did not report X 512, the number y 526 plus the number z 528 is less than or equal to a+rb. Accordingly, the UE 104, and/or the controller/processor 359 executing the PDCCH limit component 140 and/or the configuration component 142 may provide means for receiving, by the UE, a configuration of serving cells indicating a number of configured downlink serving cells with single TRP and a number of configured downlink serving cells with multiple TRPs.

In block 640, the method 600 may include determining, by the UE, a limit of a number of serving cells (Ncap) based on one of: (i) the configuration and the multiplication factor in response to determining not to signal the number representing PDCCH monitoring capability, or (ii) the number representing PDCCH monitoring capability in response to determining to signal the number representing PDCCH monitoring capability. In an aspect, for example, the UE 104, and/or the controller/processor 359 may execute the PDCCH limit component 140 and/or the Ncap component 143 to determine the Ncap based on one of: (i) the configuration (e.g., a 522 and b 524) and the multiplication factor, r, in response to determining not to signal the number representing PDCCH monitoring capability, or (ii) the number representing PDCCH monitoring capability in response to determining to signal the number representing PDCCH monitoring capability. Accordingly, the UE 104, and/or the controller/processor 359 executing the PDCCH limit component 140 and/or the Ncap component 143 may provide means for determining a limit of a number of serving cells based on one of: (i) the configuration and the multiplication factor in response to determining not to signal the number representing PDCCH monitoring capability, or (ii) the number representing PDCCH monitoring capability in response to determining to signal the number representing PDCCH monitoring capability.

For example, in sub-block 642, the block 640 may include determining the Ncap as the number of configured downlink serving cells with single TRP plus the multiplication factor multiplied by the number of configured downlink serving cells with multiple TRPs. That is, when the UE 104 does not report X and is not configured for NR-DC operation, the Ncap may be set to a+rb. If the UE 104 did report X in block 630, the Ncap may be set to X. When the UE 104 is configured for NR-DC and the UE 104 does not report X, Ncap may be a+2b, where a and b are counted in both MCG and SCG.

In block 650, the method 600 may include determining, by the UE, a total limit of PDCCH candidates and non-overlapped CCEs to monitor in a slot for a cell group and a per cell limit of PDCCH candidates and non-overlapped CCEs to monitor in a slot per scheduled cell for single TRP cells and for multiple TRP cells based on the Ncap. In an aspect, for example, the UE 104, and/or the controller/processor 359 may execute the PDCCH limit component 140 and/or the limit component 144 to determine the total limit of PDCCH candidates and non-overlapped CCEs to monitor in a slot for a cell group and a per cell limit of PDCCH candidates and non-overlapped CCEs to monitor in a slot per scheduled cell for single TRP cells and for multiple TRP cells based on the Ncap. Further details of determining the total limit and the per cell limits are discussed below with respect to FIG. 8. Accordingly, the UE 104, and/or the controller/processor 359 executing the PDCCH limit component 140 and/or the limit component 144 may provide means for determining a total limit of PDCCH candidates and non-overlapped CCEs to monitor in a slot for a cell group and a per cell limit of PDCCH candidates and non-overlapped CCEs to monitor in a slot per scheduled cell for single TRP cells and for multiple TRP cells based on the limit of the number of serving cells.

In block 660, the method 600 may include receiving a downlink control channel within a slot by performing blind decoding operations on CCEs up to the total limit and up to the per cell limit. In an aspect, for example, the UE 104, and/or the controller/processor 359 may execute the PDCCH limit component 140 and/or the decoding component 145 to receive the downlink control channel (e.g., PDCCH) within a slot by performing blind decoding operations on CCEs up to the total limit and up to the per cell limit. That is, the UE 104 may perform up to the total limit of decoding operations for PDCCH candidates, and may perform the decoding operations on up to the total limit of non-overlapped CCEs. Additionally, for each cell, the UE 104 may perform up the per cell limit of decoding operations for PDCCH candidates and may perform the decoding operations on up to the per cell limit of non-overlapped CCEs. Further details of receiving the downlink control channel in the case of overbooking on a primary cell are described below with respect to FIG. 7. Accordingly, the UE 104, and/or the controller/processor 359 executing the PDCCH limit component 140 and/or the decoding component 145 may provide means for receiving a downlink control channel within a slot by performing blind decoding operations on CCEs up to the total limit and up to the per cell limit.

Figure 7:
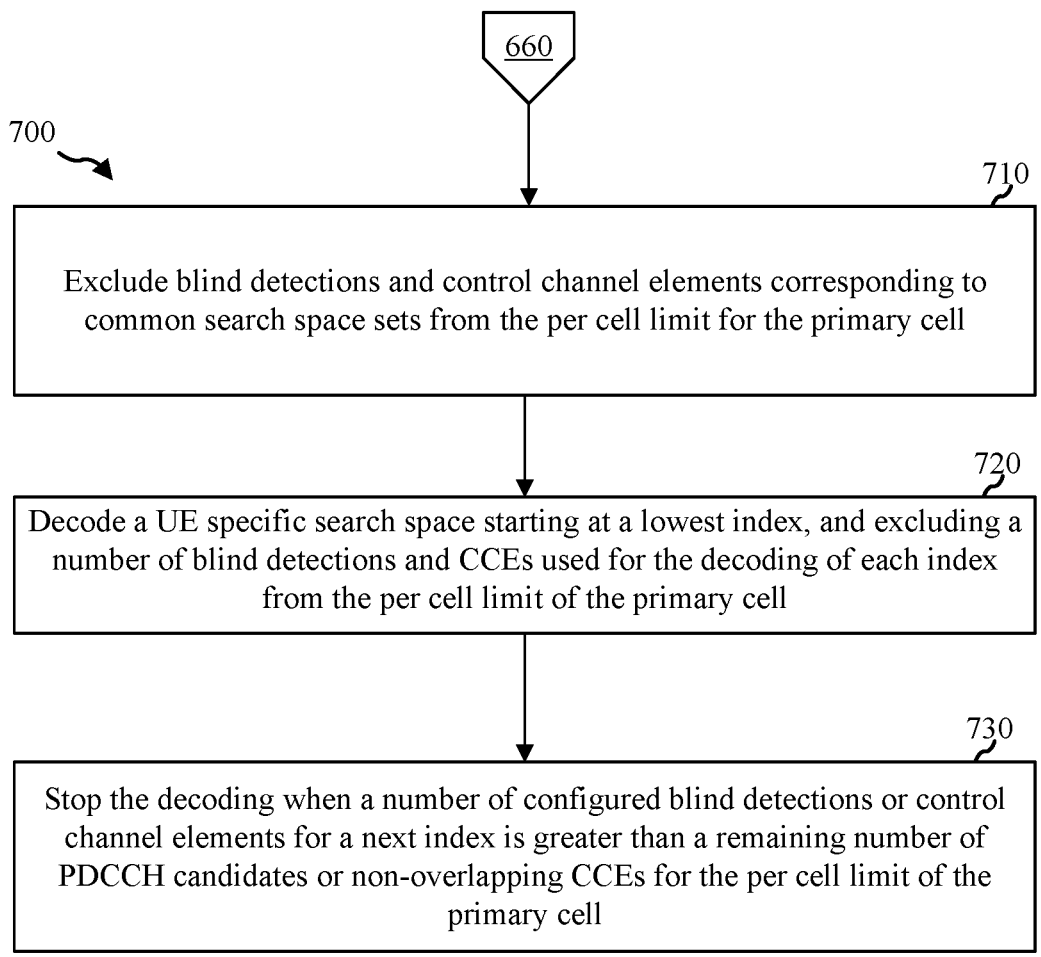
FIG. 7 is a flowchart of an example method for applying PDCCH limits to an overbooking scenario, in accordance with certain aspects of the present description.

FIG. 7 is a flowchart of a method 700 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for performing overbooking. In an aspect, the method 700 may be performed by the decoding component 145. The method 700 may correspond to the block 660 of method 600. In an aspect, where the UE 104 is configured for NR-DC, the method 700 may be performed for a per cell limit for each CORESET group. The per cell limits for each CORESET group may be half of the per cell limit for multiple TRP cells or the per cell limit for single TRP cells.

At block 710, the method 700 may include excluding blind detections and control channel elements corresponding to common search space sets from the per cell limit for the primary cell. In an aspect, for example, the decoding component 145 may exclude blind detections and control channel elements corresponding to common search space sets from the per cell limit for the primary cell. In the case of overbooking, the PDCCH candidates and CCEs for the common search spaces may be mandatory and count toward the per cell limit. Accordingly, the decoding component 145 may subtract the PDCCH candidates and CCEs for the common search spaces from the respective limits.

At block 720, the method 700 may include decoding a UE specific search space starting at a lowest index, and excluding a number of blind detections and CCEs used for the decoding of each index from the per cell limit of the primary cell. In an aspect, for example, the decoding component 145 may decode a UE specific search space starting at a lowest index, and exclude a number of blind detections and CCEs used for the decoding of each index from the per cell limit of the primary cell. That is, the UE may perform the decoding operations for each index and subtract the performed PDCCH candidates and CCEs from the respective per cell limits.

At block 730, the method 700 may include stopping the decoding when a number of configured blind detections or control channel elements for a next index is greater than a remaining number of PDCCH candidates or non-overlapped CCEs for the per cell limit of the primary cell. In an aspect, for example, the decoding component 145 may stop the decoding when a number of configured blind detections or control channel elements for a next index is greater than a remaining number of PDCCH candidates or non-overlapped CCEs for the per cell limit of the primary cell. Accordingly, the decoding component 145 may stop decoding based on the per cell limit even if additional search spaces are configured for the primary serving cell.

Figure 8:
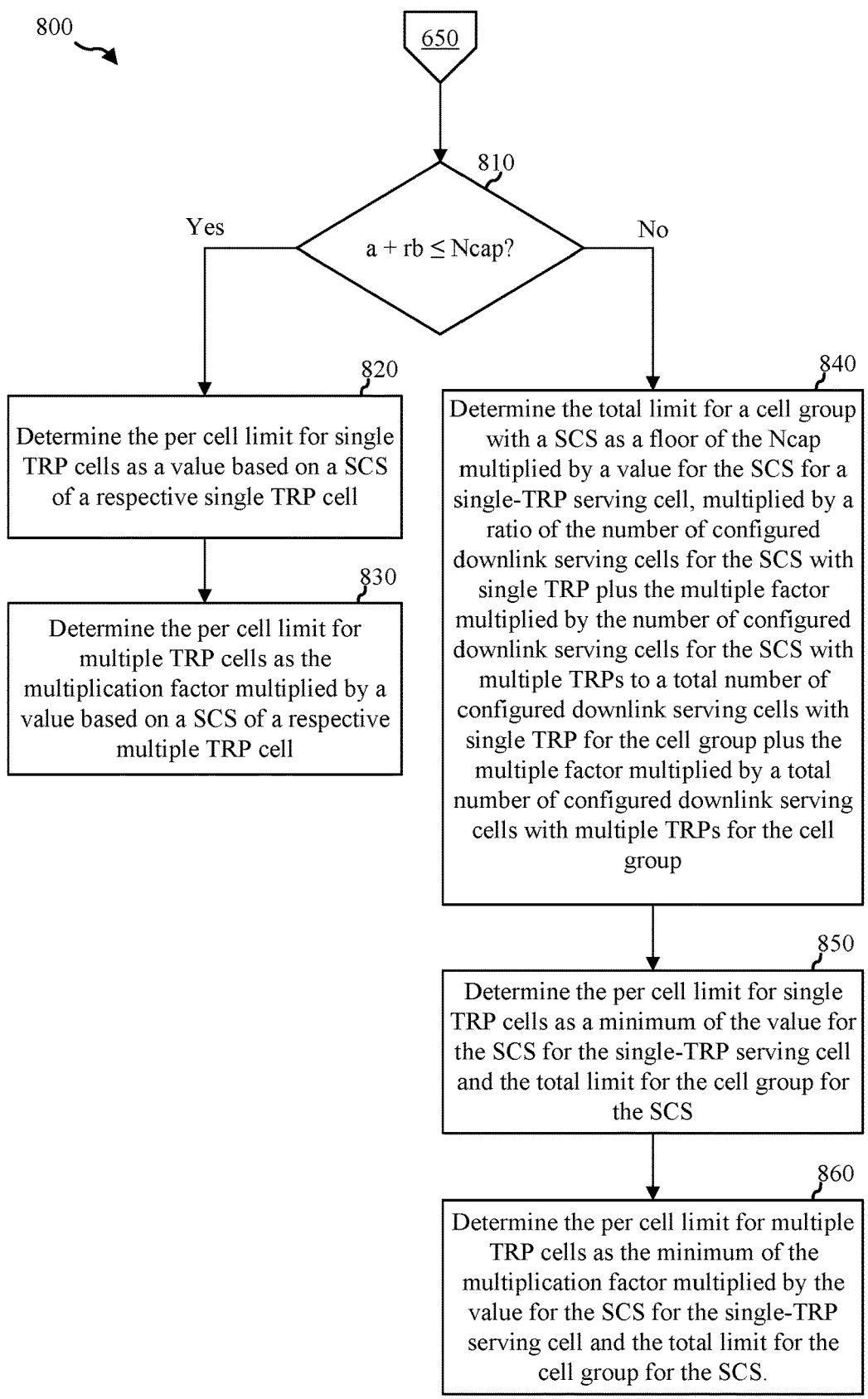
FIG. 8 is a flowchart of an example method of determining PDCCH decoding limits based on a limit on a number of cells using a multiplication factor, in accordance with certain aspects of the present description.

FIG. 8 is a flowchart of a method 800 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for determining a total limit and per cell limits. In an aspect, the method 800 may correspond to the block 650 of the method 600. The method 800 may be performed by the limit component 144.

At decision block 810, the method 800 may include determining whether an equivalent number of serving cells (a+rb) is less than or equal to the Ncap. The equivalent number of serving cells may be determined based on configured cells for each SCS For example, $N_{cells,sTRP}^{DL,\mu}$ and $N_{cells,mTRP}^{DL,\mu}$ representing the number of downlink cells that the UE 104 is configured with single-TRP and multi-TRP operation, respectively, and having active downlink BWP with SCS μ. Accordingly, in the case of 4 maximum downlink BWP, the equivalent number of serving cells may be expressed as $$\sum_{\mu=0}^{3} N_{cells,sTRP}^{DL,\mu} + r\sum_{\mu=0}^{3} N_{cells,mTRP}^{DL,\mu}.$$

That is, the limit component 144 may determine that the number of configured downlink serving cells with single TRP plus the multiplication factor multiplied by the number of configured downlink serving cells with multiple TRPs is less than or equal to the Ncap. If $$\sum_{\mu=0}^{3} N_{cells,sTRP}^{DL,\mu} + r\sum_{\mu=0}^{3} N_{cells,mTRP}^{DL,\mu} \le N_{cells}^{cap},$$

the method 800 may proceed to block 820. If $$\sum_{\mu=0}^{3} N_{cells,sTRP}^{DL,\mu} + r\sum_{\mu=0}^{3} N_{cells,mTRP}^{DL,\mu} > N_{cells}^{cap},$$

the method 800 may proceed to block 840. That is, the limit component 144 may determine that the number of configured downlink serving cells with single TRP plus the multiplication factor multiplied by the number of configured downlink serving cells with multiple TRPs is greater than the Ncap.

At block 820, the method 800 may include determining the per cell limit for single TRP cells as a value based on the SCS of a respective single TRP cell. For example, the limit component 144 may determine the per cell limit for single TRP cells as a value based on the SCS of a respective single TRP cell. That is, the limit of PDCCH candidates per scheduled cell for cells configured with single-TRP may be $M_{PDCCH}^{max,slot,\mu}$ and the limit of non-overlapped CCEs per scheduled cell for cells configured with single-TRP may be $C_{PDCCH}^{max,slot,\mu}$.

At block 830, the method 800 may include determining the per cell limit for multiple TRP cells as the multiplication factor multiplied by a value based on a SCS of a respective multiple TRP cell. For example, the limit component 144 may determine the per cell limit for multiple TRP cells as the multiplication factor multiplied by a value based on a SCS of a respective multiple TRP cell. That is, the limit of PDCCH candidates per scheduled cell for cells configured with multiple TRPs may be $rM_{PDCCH}^{max,slot,\mu}$ and the limit of non-overlapped CCEs per scheduled cell for cells configured with multiple TRPs may be $rC_{PDCCH}^{max,slot,\mu}$.

In block 840, the method 800 may include determining the total limit for a cell group with a SCS as a floor of the Ncap multiplied by a value for the SCS for a single-TRP serving cell, multiplied by a ratio of the number of configured downlink serving cells for the SCS with single TRP plus the multiplication factor multiplied by the number of configured downlink serving cells for the SCS with multiple TRPs to a total number of configured downlink serving cells with single TRP for the cell group plus the multiplication factor multiplied by a total number of configured downlink serving cells with multiple TRPs for the cell group. For instance, the limit component 144 may determine the total limit of PDCCH candidates for all downlink cells with a given SCS as $$M_{PDCCH}^{total,slot,\mu} = \left\lfloor N_{cells}^{cap} \cdot M_{PDCCH}^{max,slot,\mu} \cdot \right.$$
$$\left. \left(N_{cells,sTRP}^{DL,\mu} + rN_{cells,mTRP}^{DL,\mu}\right) \middle/ \left(\sum_{j=0}^{3} N_{cells,sTRP}^{DL,j} + r\sum_{j=0}^{3} N_{cells,mTRP}^{DL,j}\right)\right\rfloor.$$

Similarly, the limit component 144 may determine the total limit of non-overlapped CCEs for all downlink cells with a given SCS as $$C_{PDCCH}^{total,slot,\mu} = \left\lfloor N_{cells}^{cap} \cdot C_{PDCCH}^{max,slot,\mu} \cdot \right.$$
$$\left. \left(N_{cells,sTRP}^{DL,\mu} + rN_{cells,mTRP}^{DL,\mu}\right) \middle/ \left(\sum_{j=0}^{3} N_{cells,sTRP}^{DL,j} + r\sum_{j=0}^{3} N_{cells,mTRP}^{DL,j}\right)\right\rfloor.$$

In block 850, the method 800 may include determining the per cell limit for single TRP cells as a minimum of the value for the SCS for the single-TRP serving cell and the total limit for the cell group for the SCS. For instance, the limit component 144 may determine the per cell limit for single TRP calls as $\min(M_{PDCCH}^{max,slot,\mu}, M_{PDCCH}^{total,slot,\mu})$ and determine the per cell limit of non-overlapped CCEs as $\min(C_{PDCCH}^{max,slot,\mu}, C_{PDCCH}^{total,slot,\mu})$.

In block 860, the method 800 may include determining the per cell limit for multiple TRP cells as the minimum of the multiplication factor multiplied by the value for the SCS for the single-TRP serving cell and the total limit for the cell group for the SCS. For instance, the limit component 144 may determine the per cell limit of PDCCH candidates for multiple TRP cells as $\min(rM_{PDCCH}^{max,slot,\mu}, M_{PDCCH}^{total,slot,\mu})$ and determine the per cell limit of non-overlapped CCEs as $\min(rC_{PDCCH}^{max,slot,\mu}, C_{PDCCH}^{total,slot,\mu})$.

Figure 9:
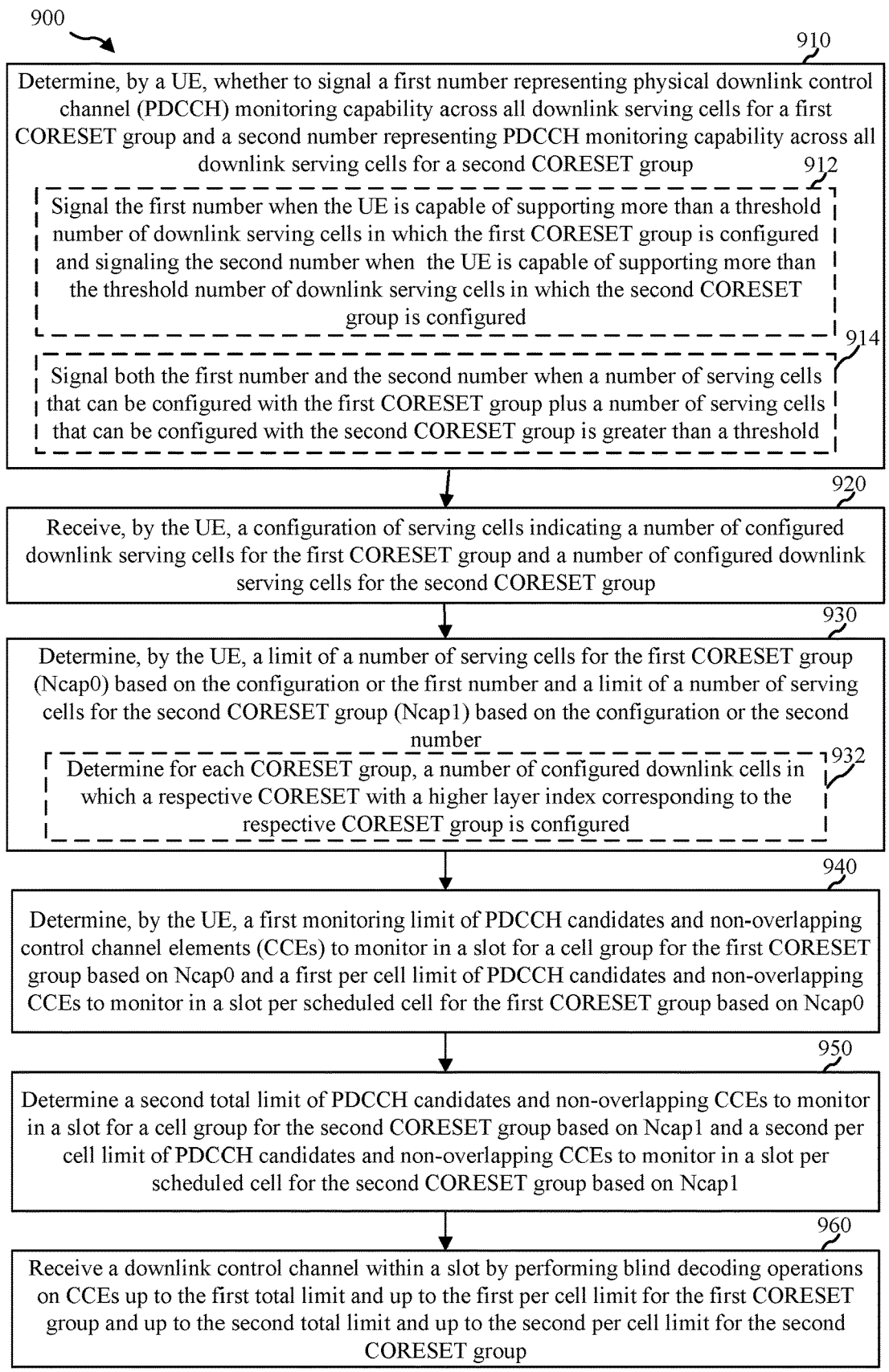
FIG. 9 is a flowchart of a second example method of wireless communication according to PDCCH decoding limits for each CORESET group, in accordance with certain aspects of the present description.

FIG. 9 is a flowchart of a method 900 of wireless communication that may be performed by a UE (e.g., the UE 104, which may include the memory 360 and which may be the entire UE 104 or a component of the UE 104 such as the PDCCH limit component 140, TX processor 368, the RX processor 356, and/or the controller/processor 359) for establishing limits on blind decoding of PDCCH. The method 900 may correspond to the second implementation of establishing limits on blind decoding using separate limits for each CORESET group.

In block 910, the method 900 may include determining, by a UE, whether to signal, a first number representing PDCCH monitoring capability across all downlink serving cells for a first CORESET group and a second number representing PDCCH monitoring capability across all downlink serving cells for a second CORESET group. In an aspect, for example, the UE 104, and/or the controller/processor 359 may execute the PDCCH limit component 140 and/or the capability component 141 to determine whether to signal, a first number (X1) representing PDCCH monitoring capability across all downlink serving cells for a first CORESET group and a second number (X2) representing PDCCH monitoring capability across all downlink serving cells for a second CORESET group. Accordingly, the UE 104, and/or the controller/processor 359 executing the PDCCH limit component 140 and/or the capability component 141 may provide means for determining whether to signal, a first number representing PDCCH monitoring capability across all downlink serving cells for a first CORESET group and a second number representing PDCCH monitoring capability across all downlink serving cells for a second CORESET group.

In sub-block 912, the block 910 may optionally include signaling the first number when the UE is capable of supporting more than a threshold number of downlink serving cells in which the first CORESET group is configured and signaling the second number when the UE is capable of supporting more than the threshold number of downlink serving cells in which the second CORESET group is configured. For instance, the capability component 141 may signal X1 when the UE 104 is capable of supporting more than a threshold number (e.g., 4) of downlink serving cells in which the first CORESET group is configured and may signal X1 when the UE is capable of supporting more than the threshold number (e.g., 4) of downlink serving cells in which the second CORESET group is configured. The value of X0 may be greater than or equal to 4. The value of X1 may be greater than or equal to 4.

In sub-block 914, the method 900 may optionally include signaling both the first number and the second number when a number of serving cells that can be configured with the first CORESET group plus a number of serving cells that can be configured with the second CORESET group is greater than a threshold. That is the UE is capable of supporting A or more serving cells that can be configured with only one CORESET group and B or more serving cells that can be configured with 2 CORESET groups such that A+2B>4. For instance, the capability component 141 may signal both X1 and X2 when a number of serving cells that can be configured with the first CORESET group plus a number of serving cells that can be configured with the second CORESET group is greater than a threshold. The value of X0 plus X1 is greater than or equal to the threshold (e.g., 4). If UE is configured with NR-DC, the UE may also signal Y0, Y1, Z0, Z1. If the UE reports X0, the value of Y0+Z0 is greater than or equal to X0. If the UE reports X1, the value of Y1+Z1 is greater than or equal to X1. If the UE does not report X0, Y0+Z0 is greater than or equal to the maximum number of downlink cells in which the first CORESET group can be configured. If the UE does not report X1, Y1+Z1 is greater than or equal to the maximum number of downlink cells in which the second CORESET group can be configured.

In block 920, the method 900 may include receiving, by the UE, a configuration of serving cells indicating a number of configured downlink serving cells for the first CORESET group and a number of configured downlink serving cells for the second CORESET group. In an aspect, for example, the UE 104, and/or the controller/processor 359 may execute the PDCCH limit component 140 and/or the configuration component 142 to receive, by the UE, a cell configuration 520 of serving cells indicating a number of configured downlink serving cells for the first CORESET group and a number of configured downlink serving cells for the second CORESET group. If UE is configured with NR-DC, the cell configuration 520 may include y0 and z0 for the first CORESET group and y1 and z1 for the second CORESET group. The value of y0 is less than or equal to Y0. The value of z0 is less than or equal to Z0. The value of y1 is less than or equal to Y1. The value of z1 is less than or equal to Z1. If UE reports X0, y0+z0 is less than or equal to X0. Otherwise, y0+z0 is less than or equal to the number of configured DL cells in which CORESETs with higher layer index=0 is configured in both MCG and SCG and y1+z1 is less than or equal to the number of configured DL cells in which CORESETs with higher layer index=1 are configured. Accordingly, the UE 104, and/or the controller/processor 359 executing the PDCCH limit component 140 and/or the capability component 141 may provide means for receiving a configuration of serving cells indicating a number of configured downlink serving cells for the first CORESET group and a number of configured downlink serving cells for the second CORESET group.

In block 930, the method 900 may include determining, by the UE, a limit of a number of serving cells for the first CORESET group (Ncap0) based on the configuration or the first number and a limit of a number of serving cells for the second CORESET group (Ncap1) based on the configuration or the second number. In an aspect, for example, the UE 104, and/or the controller/processor 359 may execute the PDCCH limit component 140 and/or the Ncap component 143 to determine the limit of the number of serving cells for the first CORESET group (Ncap0) based on the configuration or the first number X1 and the limit of a number of serving cells for the second CORESET group (Ncap1) based on the configuration or the second number X2. Accordingly, the UE 104, and/or the controller/processor 359 executing the PDCCH limit component 140 and/or the Ncap component 143 may provide means for receiving a configuration of serving cells indicating a number of configured downlink serving cells for the first CORESET group and a number of configured downlink serving cells for the second CORESET group.

In sub-block 932, the block 930 may include determining for each CORESET group, a number of configured downlink cells in which a respective CORESET with a higher layer index corresponding to the respective CORESET group is configured. For instance, the Ncap component 143 may determine for each CORESET group, a number of configured downlink cells in which a respective CORESET with a higher layer index corresponding to the respective CORESET group is configured. For example, if the UE does not report X0, Ncap0 may be set to the number of configured DL cells in which CORESETs with higher layer index=0 are configured. Similarly, if the UE does not report X1, Ncap1 may be set to the number of configured DL cells in which CORESETs with higher layer index=1 are configured. If X0 or X1 is reported, the respective Ncap0 or Ncap1 may be set to the reported value of X0 or X1. If the UE 104 is configured for NR-DC, the values of Ncap0 may be separately determined for MCG and SCG through y0 and z0 for the first CORESET group, and the values of Ncap1 may be separately determined for MCG and SCG through y1 and z1 for the second CORESET group.

In block 940, the method 900 may include determining, by the UE, a first total limit of PDCCH candidates and non-overlapped CCEs to monitor in a slot for a cell group for the first CORESET group based on Ncap0 and a first per cell limit of PDCCH candidates and non-overlapped CCEs to monitor in a slot per scheduled cell for the first CORESET group based on Ncap0. In an aspect, for example, the UE 104, and/or the controller/processor 359 may execute the PDCCH limit component 140 and/or the limit component 144 to determine the first total limit of PDCCH candidates and non-overlapped CCEs to monitor in a slot for a cell group for the first CORESET group based on Ncap0 and a first per cell limit of PDCCH candidates and non-overlapped CCEs to monitor in a slot per scheduled cell for the first CORESET group based on Ncap0. Accordingly, the UE 104, and/or the controller/processor 359 executing the PDCCH limit component 140 and/or the limit component 144 may provide means for determining a first total limit of PDCCH candidates and non-overlapped CCEs to monitor in a slot for a cell group for the first CORESET group based on the limit of the number of serving cells for the first CORESET group and a first per cell limit of PDCCH candidates and non-overlapped CCEs to monitor in a slot per scheduled cell for the first CORESET group based on the limit of the number of serving cells for the first CORESET group.

In block 950, the method 900 may include determining a second total limit of PDCCH candidates and non-overlapped CCEs to monitor in a slot for a cell group for the second CORESET group based on Ncap1 and a second per cell limit of PDCCH candidates and non-overlapped CCEs to monitor in a slot per scheduled cell for the second CORESET group based on Ncap1. In an aspect, for example, the UE 104, and/or the controller/processor 359 may execute the PDCCH limit component 140 and/or the limit component 144 to determine the second total limit of PDCCH candidates and non-overlapped CCEs to monitor in a slot for the cell group for the second CORESET group based on Ncap1 and the second per cell limit of PDCCH candidates and non-overlapped CCEs to monitor in the slot per scheduled cell for the second CORESET group based on Ncap1. Accordingly, the UE 104, and/or the controller/processor 359 executing the PDCCH limit component 140 and/or the limit component 144 may provide means for determining a second total limit of PDCCH candidates and non-overlapped CCEs to monitor in a slot for a cell group for the second CORESET group based on the limit of the number of serving cells for the second CORESET group and a second per cell limit of PDCCH candidates and non-overlapped CCEs to monitor in a slot per scheduled cell for the second CORESET group based on the limit of the number of serving cells for the second CORESET group.

In block 960, the method 900 may include receiving a downlink control channel within a slot by performing blind decoding operations on CCEs up to the first total limit and up to the first per cell limit for the first CORESET group and on up to the second total limit and up to the second per cell limit for the second CORESET group. In an aspect, for example, the UE 104, and/or the controller/processor 359 may execute the PDCCH limit component 140 and/or the decoding component 145 to receive the downlink control channel within the slot by performing blind decoding operations on CCEs up to the first total limit and up to the first per cell limit for the first CORESET group and on up to the second total limit and up to the second per cell limit for the second CORESET group. In the case where a primary serving cell utilizes overbooking, the UE 104 may perform the method 700 for the first CORESET group using the first per cell limit and perform the method 700 a second time for the second CORESET group using the second per cell limit. Accordingly, the UE 104, and/or the controller/processor 359 executing the PDCCH limit component 140 and/or the decoding component 145 may provide means for means for receiving a downlink control channel within a slot by performing blind decoding operations on CCEs up to the first total limit and up to the first per cell limit for the first CORESET group and on up to the second total limit and up to the second per cell limit for the second CORESET group.

Figure 10:
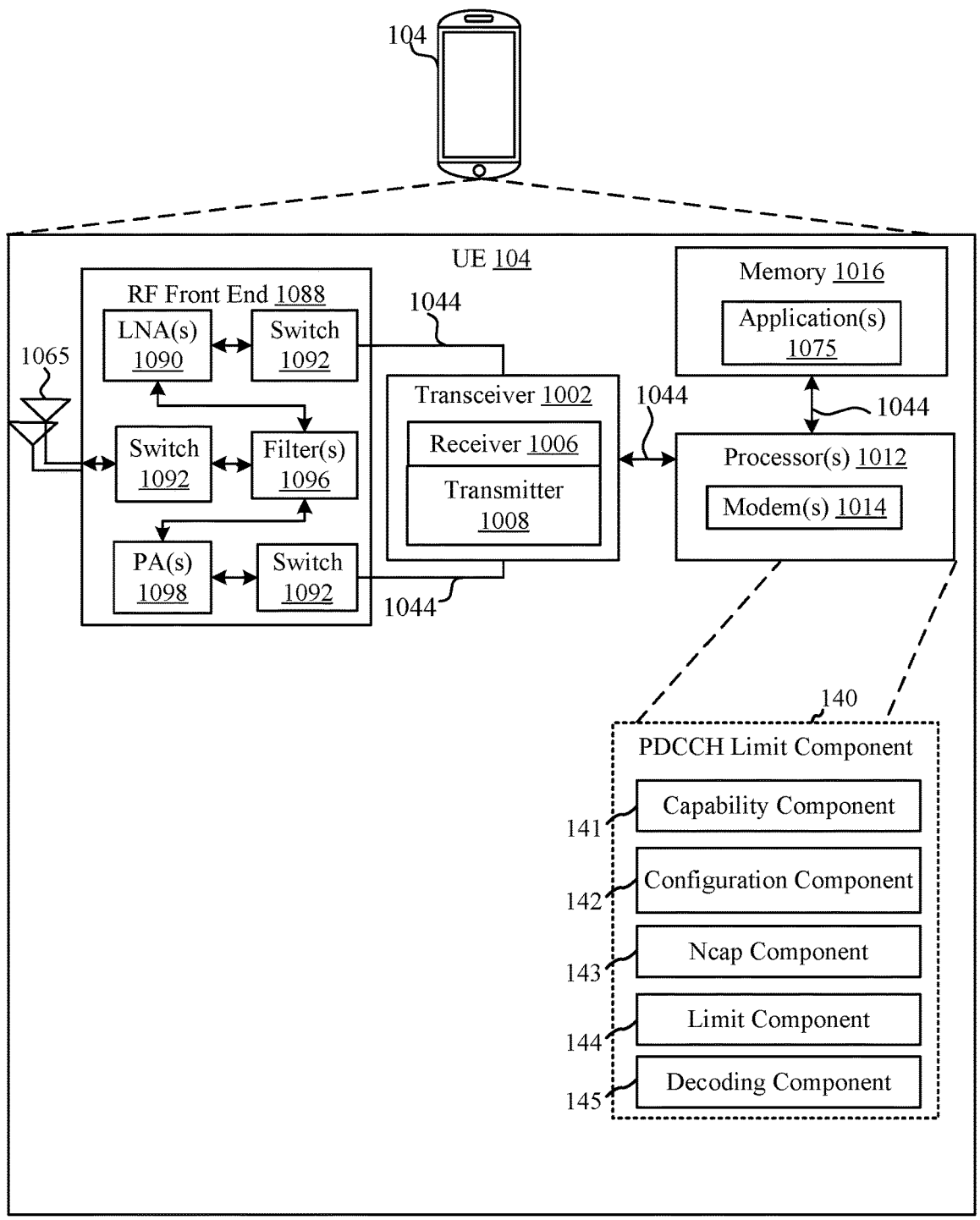
FIG. 10 is a schematic diagram of example components of the UE of FIG. 1, in accordance with certain aspects of the present description.

Referring to FIG. 10, one example of an implementation of UE 104 may include a variety of components, some of which have already been described above, but including components such as one or more processors 1012 and memory 1016 and transceiver 1002 in communication via one or more buses 1044, which may operate in conjunction with modem 1014, and PDCCH limit component 140 to enable one or more of the functions described herein related to limits on PDCCH decoding. Further, the one or more processors 1012, modem 1014, memory 1016, transceiver 1002, RF front end 1088 and one or more antennas 1065 may be configured to support voice and/or data calls (simultaneously or non-simultaneously) in one or more radio access technologies. The antennas 1065 may include one or more antennas, antenna elements, and/or antenna arrays.

In an aspect, the one or more processors 1012 may include a modem 1014 that uses one or more modem processors. The various functions related to PDCCH limit component 140 may be included in modem 1014 and/or processors 1012 and, in an aspect, may be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with PDCCH limit component 140 may be performed by transceiver 1002.

Also, memory 1016 may be configured to store data used herein and/or local versions of applications 1075, PDCCH limit component 140 and/or one or more of subcomponents thereof being executed by at least one processor 1012. Memory 1016 may include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining PDCCH limit component 140 and/or one or more of subcomponents thereof, and/or data associated therewith, when UE 104 is operating at least one processor 1012 to execute PDCCH limit component 140 and/or one or more subcomponents thereof.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. RF front end 1088 may be connected to one or more antennas 1065 and may include one or more low-noise amplifiers (LNAs) 1090, one or more switches 1092, one or more power amplifiers (PAs) 1098, and one or more filters 1096 for transmitting and receiving RF signals.

In an aspect, LNA 1090 may amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 may be used by RF front end 1088 to filter a received signal to obtain an input RF signal. Similarly, in an aspect, for example, a respective filter 1096 may be used to filter an output from a respective PA 1098 to produce an output signal for transmission. In an aspect, each filter 1096 may be connected to a specific LNA 1090 and/or PA 1098. In an aspect, RF front end 1088 may use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver 1002 may be tuned to operate at specified frequencies such that UE 104 can communicate with, for example, one or more base stations 102 or one or more cells associated with one or more base stations 102. In an aspect, for example, modem 1014 may configure transceiver 1002 to operate at a specified frequency and power level based on the UE configuration of the UE 104 and the communication protocol used by modem 1014.

In an aspect, modem 1014 may be a multiband-multimode modem, which can process digital data and communicate with transceiver 1002 such that the digital data is sent and received using transceiver 1002. In an aspect, modem 1014 may be multiband and be configured to support multiple frequency bands for a specific communications protocol. In an aspect, modem 1014 may be multimode and be configured to support multiple operating networks and communications protocols. In an aspect, modem 1014 may control one or more components of UE 104 (e.g., RF front end 1088, transceiver 1002) to enable transmission and/or reception of signals from the network based on a specified modem configuration. In an aspect, the modem configuration may be based on the mode of the modem and the frequency band in use. In another aspect, the modem configuration may be based on UE configuration information associated with UE 104 as provided by the network during cell selection and/or cell reselection.

Figure 11:
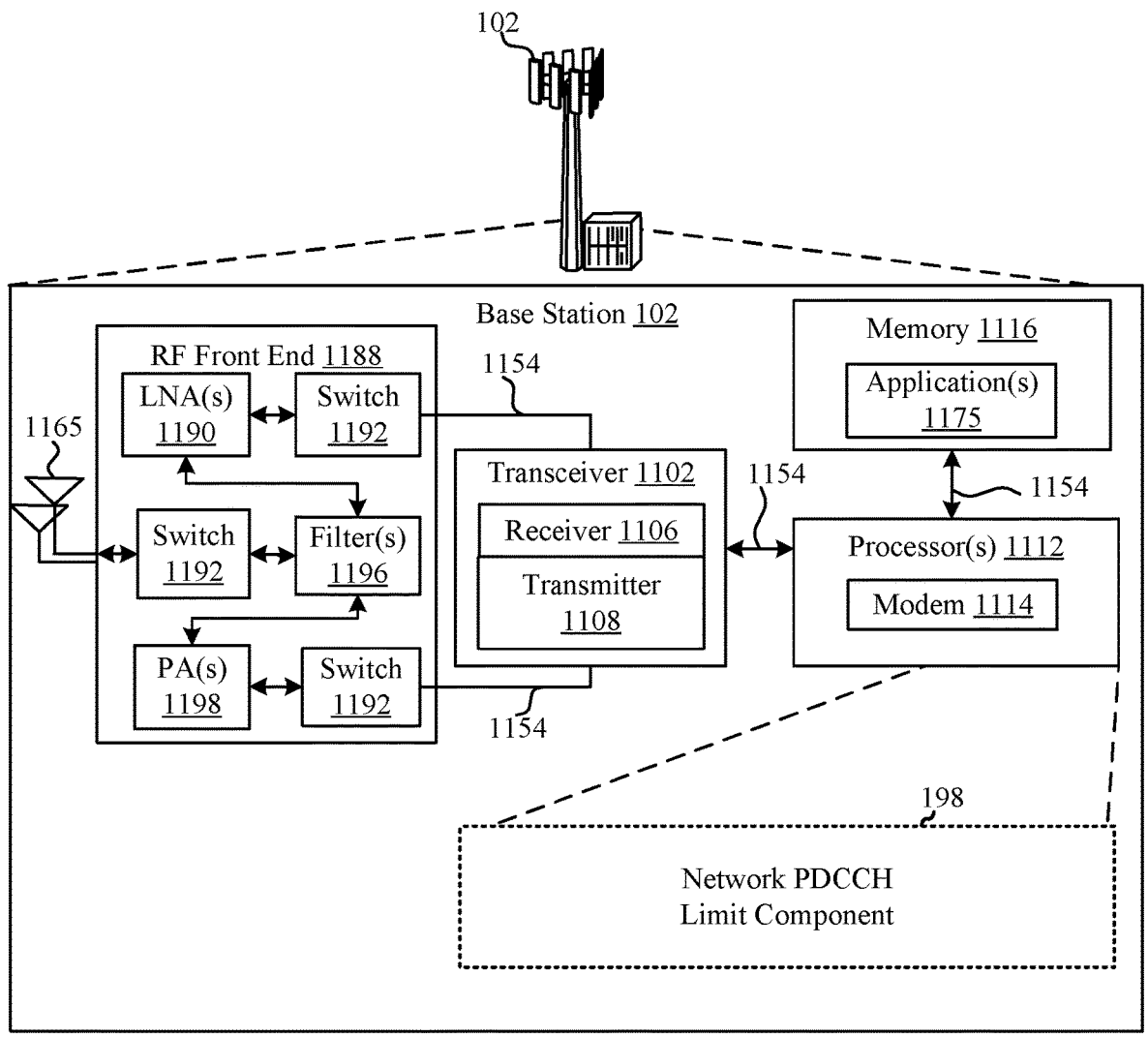
FIG. 11 is a schematic diagram of example components of the base station of FIG. 1, in accordance with certain aspects of the present description.

Referring to FIG. 11, one example of an implementation of base station 102 may include a variety of components, some of which have already been described above, but including components such as one or more processors 1112 and memory 1116 and transceiver 1102 in communication via one or more buses 1154, which may operate in conjunction with modem 1114 and network PDCCH limit component 198 to enable one or more of the functions described herein related to PDCCH limits.

The transceiver 1102, receiver 1106, transmitter 1108, one or more processors 1112, memory 1116, applications 1175, buses 1154, RF front end 1188, LNAs 1190, switches 1192, filters 1196, PAs 1198, and one or more antennas 1165 may be the same as or similar to the corresponding components of UE 104, as described above, but configured or otherwise programmed for base station operations as opposed to UE operations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving, by a user equipment (UE), a configuration of serving cells indicating a number of configured downlink serving cells without control resource set (CORESET) grouping or with one CORESET group and a number of configured downlink serving cells with two CORESET groups;
determining, by the UE, a number of serving cells based on the configuration and a multiplication factor for serving cells with two CORESET groups, for signaling a number representing physical downlink control channel (PDCCH) monitoring capability across all downlink serving cells;
determining, by the UE, a limit of a number of serving cells based on one of: (i) the configuration and the multiplication factor in response to the number representing PDCCH monitoring capability not to be signaled, or (ii) the number representing PDCCH monitoring capability in response to the number representing PDCCH monitoring capability to be signaled;
determining, by the UE, a total limit of PDCCH candidates and non-overlapped control channel elements (CCEs) to monitor in a slot for a cell group and a per cell limit of PDCCH candidates and non-overlapped CCEs to monitor in a slot per scheduled cell for cells without CORESET grouping or with one CORESET group and for cells with two CORESET groups based on the limit of the number of serving cells; and
receiving a downlink control channel within a slot by performing blind decoding operations on CCEs up to the total limit and up to the per cell limit.

2. The method of claim 1, wherein receiving the downlink control channel further comprises, for a primary cell:
excluding blind detections and control channel elements corresponding to common search space sets from the per cell limit for the primary cell;
decoding a UE specific search space for an index starting at a lowest index, and excluding a number of blind detections and CCEs used for the decoding of the index from the per cell limit of the primary cell; and
stopping the decoding when a number of configured blind detections or control channel elements for a next index is greater than a remaining number of PDCCH candidates or non-overlapped CCEs for the per cell limit of the primary cell.

3. The method of claim 1, wherein the per cell limit for a cell with two CORESET groups includes a limit per CORESET group.

4. The method of claim 3, wherein the limit per CORESET group is equal to the per cell limit for cells with two CORESET groups divided by the multiplication factor or is equal to the per cell limit for cells without CORESET grouping or with one CORESET group.

5. The method of claim 1, wherein determining, by a UE, the number of serving cells based on the configuration and the multiplication factor comprises determining the number of serving cells as a first number of cells without CORESET grouping or with one CORESET group plus the multiplication factor multiplied by a second number of cells with two CORESET groups.

6. The method of claim 5, further comprising signaling the number representing PDCCH monitoring capability across all downlink serving cells with a value less than or equal to the first number of cells without CORESET grouping or with one CORESET group plus the multiplication factor multiplied by the second number of cells with two CORESET groups.

7. The method of claim 1, wherein determining, by the UE, the limit of the number of serving cells based on the configuration and the multiplication factor comprises determining the limit of the number of serving cells as the number of configured downlink serving cells without CORESET grouping or with one CORESET group plus the multiplication factor multiplied by the number of configured downlink serving cells with two CORESET groups.

8. The method of claim 1, wherein determining, by the UE, the total limit for the cell group and the per cell limit per scheduled cell for cells without CORESET grouping or with one CORESET group and for cells with two CORESET groups based on the limit of the number of serving cells comprises:
determining that the number of configured downlink serving cells without CORESET grouping or with one CORESET group plus the multiplication factor multiplied by the number of configured downlink serving cells with two CORESET groups is less than or equal to the limit of the number of serving cells;

determining the per cell limit for cells without CORESET grouping or with one CORESET group as a value for a sub-carrier spacing (SCS) for a serving cell without CORESET grouping or with one CORESET group; and determining the per cell limit for cells with two CORESET groups as the multiplication factor multiplied by a value for the SCS for the serving cell with two CORESET groups.

9. The method of claim 1, wherein determining, by the UE, the total limit and the per cell limit for cells without CORESET grouping or with one CORESET group and for cells with two CORESET groups based on the limit of the number of serving cells comprises:

determining that the number of configured downlink serving cells without CORESET grouping or with one CORESET group plus the multiplication factor multiplied by the number of configured downlink serving cells with two CORESET groups is greater than the limit of the number of serving cells; and determining the total limit for a cell group with a SCS as a floor of the limit of the number of serving cells multiplied by a value for the SCS for a serving cell without CORESET grouping or with one CORESET group, multiplied by a ratio of the number of configured downlink serving cells for the SCS without CORESET grouping or with one CORESET group plus the multiplication factor multiplied by the number of configured downlink serving cells for the SCS with two CORESET groups to a total number of configured downlink serving cells without CORESET grouping or with one CORESET group for the cell group plus the multiplication factor multiplied by a total number of configured downlink serving cells with two CORESET groups for the cell group.

10. The method of claim 9, wherein determining, by the UE, the total limit and the per cell limit for cells without CORESET grouping or with one CORESET group and for cells with two CORESET groups based on the limit of the number of serving cells comprises:

determining the per cell limit for cells without CORESET grouping or with one CORESET group as a minimum of the value for the SCS for the serving cell without CORESET grouping or with one CORESET group and the total limit for the cell group for the SCS; and determining the per cell limit for cells with two CORESET groups as the minimum of the multiplication factor multiplied by the value for the SCS for the serving cell without CORESET grouping or with one CORESET group and the total limit for the cell group for the SCS.

11. A user equipment (UE) for wireless communication, comprising:

a memory; and at least one processor coupled to the memory and configured to:

receive a configuration of serving cells indicating a number of configured downlink serving cells without control resource set (CORESET) grouping or with one CORESET group and a number of configured downlink serving cells with two CORESET groups;

determine a number of serving cells based on the configuration and a multiplication factor for serving cells with two CORESET groups, for signaling a number representing physical downlink control channel (PDCCH) monitoring capability across all downlink serving cells;

determine a limit of a number of serving cells based on one of: (i) the configuration and the multiplication factor in response to the number representing PDCCH monitoring capability not to be signaled, or (ii) the number representing PDCCH monitoring capability in response to the number representing PDCCH monitoring capability to be signaled;

determine a total limit of PDCCH candidates and non-overlapped control channel elements (CCEs) to monitor in a slot for a cell group and a per cell limit of PDCCH candidates and non-overlapped CCEs to monitor in a slot per scheduled cell for cells without CORESET grouping or with one CORESET group and for cells with two CORESET groups based on the limit of the number of serving cells; and receive a downlink control channel within a slot by performing blind decoding operations on CCEs up to the total limit and up to the per cell limit.

12. The UE of claim 11, wherein the at least one processor is configured to receive the downlink control channel, for a primary cell, by:

excluding blind detections and control channel elements corresponding to common search space sets from the per cell limit for the primary cell;

decoding a UE specific search space for an index starting at a lowest index, and excluding a number of blind detections and CCEs used for the decoding of the index from the per cell limit of the primary cell; and stopping the decoding when a number of configured blind detections or control channel elements for a next index is greater than a remaining number of PDCCH candidates or non-overlapped CCEs for the per cell limit of the primary cell.

13. The UE of claim 11, wherein the per cell limit for a cell with two CORESET groups includes a limit per CORESET group.

14. The UE of claim 13, wherein the limit per CORESET group is equal to the per cell limit for cells with two CORESET groups divided by the multiplication factor or is equal to the per cell limit for cells without CORESET grouping or with one CORESET group.

15. The UE of claim 11, wherein the at least one processor is configured to determine the number of serving cells by determining the number of serving cells as a first number of cells without CORESET grouping or with one CORESET group plus the multiplication factor multiplied by a second number of cells with two CORESET groups.

16. The UE of claim 15, wherein the at least one processor is configured to signal the number representing PDCCH monitoring capability across all downlink serving cells with a value less than or equal to the first number of cells without CORESET grouping or with one CORESET group plus the multiplication factor multiplied by the second number of cells with two CORESET groups.

17. The UE of claim 11, wherein the at least one processor is configured to determine the limit of the number of serving cells by determining the limit of the number of serving cells as the number of configured downlink serving cells without CORESET grouping or with one CORESET group plus the multiplication factor multiplied by the number of configured downlink serving cells with two CORESET groups.

18. The UE of claim 11, wherein the at least one processor is configured to determine the total limit for the cell group and the per cell limit per scheduled cell for cells without CORESET grouping or with one CORESET group and for cells with two CORESET groups based on the limit of the number of serving cells by:
  determining that the number of configured downlink serving cells without CORESET grouping or with one CORESET group plus the multiplication factor multiplied by the number of configured downlink serving cells with two CORESET groups is less than or equal to the limit of the number of serving cells;
  determining the per cell limit for cells without CORESET grouping or with one CORESET group as a value for a sub-carrier spacing (SCS) for a serving cell without CORESET grouping or with one CORESET group; and
  determining the per cell limit for cells with two CORESET groups as the multiplication factor multiplied by a value for the SCS for the serving cell with two CORESET groups.

19. The UE of claim 11, wherein the at least one processor is configured to determine the total limit and the per cell limit for cells without CORESET grouping or with one CORESET group and for cells with two CORESET groups based on the limit of the number of serving cells by:
  determining that the number of configured downlink serving cells without CORESET grouping or with one CORESET group plus the multiplication factor multiplied by the number of configured downlink serving cells with two CORESET groups is greater than the limit of the number of serving cells; and
  determining the total limit for a cell group with a SCS as a floor of the limit of the number of serving cells multiplied by a value for the SCS for a serving cell without CORESET grouping or with one CORESET group, multiplied by a ratio of the number of configured downlink serving cells for the SCS without CORESET grouping or with one CORESET group plus the multiplication factor multiplied by the number of configured downlink serving cells for the SCS with two CORESET groups to a total number of configured downlink serving cells without CORESET grouping or with one CORESET group for the cell group plus the multiplication factor multiplied by a total number of configured downlink serving cells with two CORESET groups for the cell group.

20. The UE of claim 19, wherein the at least one processor is configured to determine the total limit and the per cell limit for cells without CORESET grouping or with one CORESET group and for cells with two CORESET groups based on the limit of the number of serving cells by:
  determining the per cell limit for cells without CORESET grouping or with one CORESET group as a minimum of the value for the SCS for the serving cell without CORESET grouping or with one CORESET group and the total limit for the cell group for the SCS; and
  determining the per cell limit for cells with two CORESET groups as the minimum of the multiplication factor multiplied by the value for the SCS for the serving cell without CORESET grouping or with one CORESET group and the total limit for the cell group for the SCS.

* * * * *